(12) United States Patent
Hayashi

(10) Patent No.: US 7,167,988 B2
(45) Date of Patent: Jan. 23, 2007

(54) INFORMATION PROCESSING METHOD AND INFORMATION PROCESSING APPARATUS

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 759 days.

(21) Appl. No.: 10/465,615

(22) Filed: Jun. 20, 2003

(65) Prior Publication Data

US 2004/0003261 A1 Jan. 1, 2004

(30) Foreign Application Priority Data

Jun. 28, 2002 (JP) ............................. 2002-191281

(51) Int. Cl.
*G06F 11/30* (2006.01)

(52) U.S. Cl. .................. 713/187; 380/54; 380/217; 380/269; 709/229; 382/123; 382/232

(58) Field of Classification Search ................ 713/187; 380/54, 217, 269; 709/229; 382/123, 232
See application file for complete search history.

(56) References Cited

U.S. PATENT DOCUMENTS

| | | | | |
|---|---|---|---|---|
| 5,251,265 A | * | 10/1993 | Dohle et al. ................. | 382/123 |
| 5,499,294 A | | 3/1996 | Friedman ..................... | 380/10 |
| 5,636,292 A | * | 6/1997 | Rhoads ........................ | 382/232 |
| 5,875,249 A | * | 2/1999 | Mintzer et al. ............... | 380/54 |
| 5,889,868 A | * | 3/1999 | Moskowitz et al. ........ | 713/176 |
| 6,275,599 B1 | * | 8/2001 | Adler et al. ................. | 382/100 |
| 6,367,019 B1 | * | 4/2002 | Ansell et al. ................. | 726/26 |
| 6,535,616 B1 | | 3/2003 | Hayashi et al. | |
| 6,535,919 B1 | * | 3/2003 | Inoue et al. ................. | 709/229 |
| 2001/0055390 A1 | | 12/2001 | Hayashi et al. | |
| 2002/0172398 A1 | | 11/2002 | Hayashi | |
| 2002/0199106 A1 | | 12/2002 | Hayashi | |
| 2003/0043852 A1 | * | 3/2003 | Tadayon et al. ............ | 370/477 |
| 2003/0059086 A1 | | 3/2003 | Hayashi | |
| 2003/0128863 A1 | | 7/2003 | Hayashi | |

* cited by examiner

*Primary Examiner*—Taghi T. Arani
(74) *Attorney, Agent, or Firm*—Fitzpatrick, Cella, Harper & Scinto

(57) ABSTRACT

A code stream and data indicating a normalization method are inputted to a normalization processing unit 21, and the normalization processing unit applies normalization processing to the code stream to generate a normalized code stream. Next, when signature data is inputted, a verification processing unit 22 performs encryption and decryption processing with respect to the signature data using a public key Kp and calculates a Hash value (first Hash value) and, on the other hand, calculates a Hash value of the normalized code stream (second Hash value). Next, the verification processing unit compares the first Hash value and the second Hash value and, if the first Hash value and the second Hash value are equal, judges that the code stream is not falsified. On the other hand, if the first Hash value and the second Hash value are not equal, the verification processing unit judges that the code stream is falsified.

14 Claims, 20 Drawing Sheets

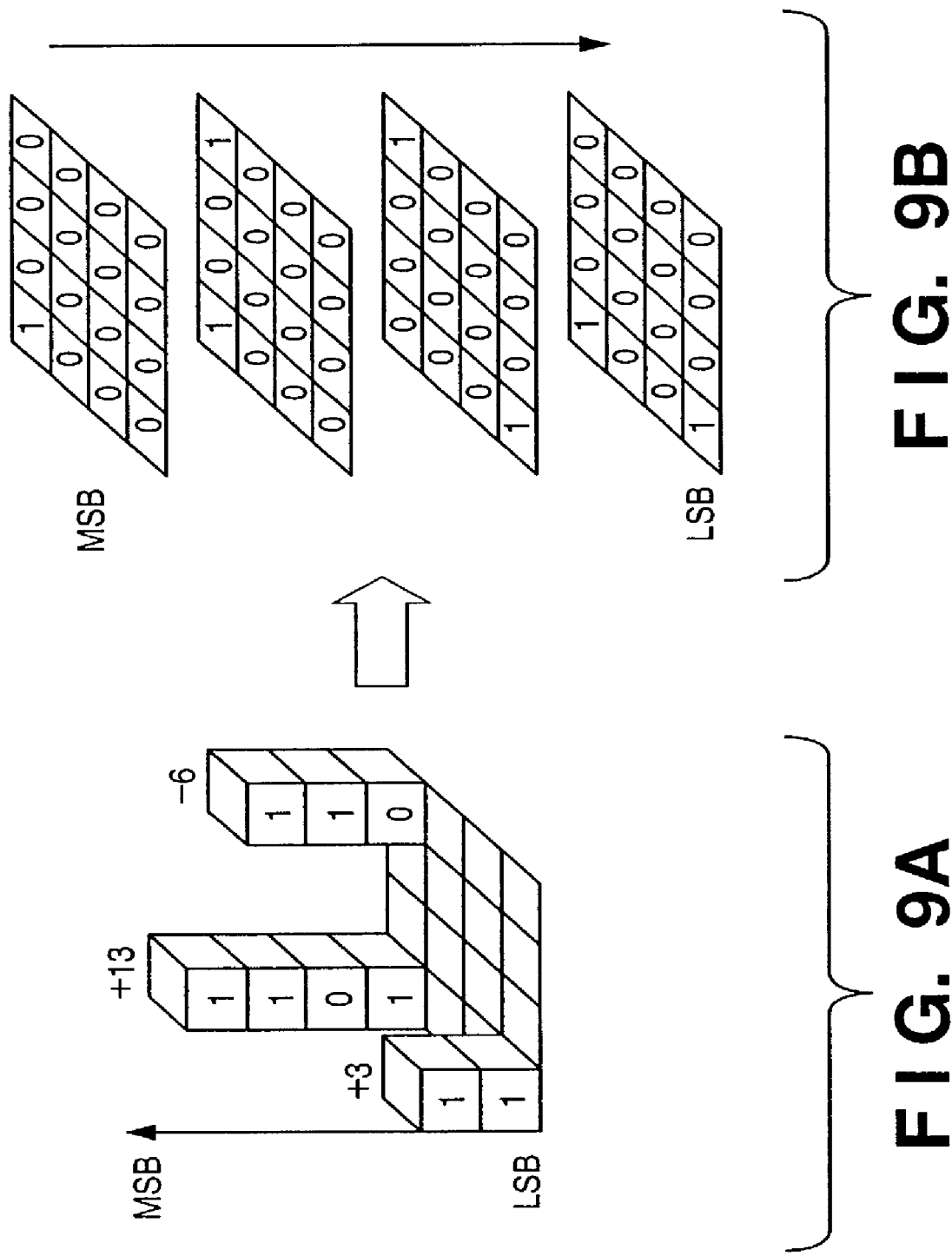

FIG. 10A

MH | TH0 | BS0 | TH1 | BS1 | ... | THn-1 | BSn-1

FIG. 10B

IMAGE SIZE | TILE SIZE | NUMBER OF COMPONENTS | COMPONENT INFORMATION

FIG. 10C

TILE LENGTH | CODING PARAMETERS | MASK INFORMATION | NUMBER OF BIT SHIFTS

FIG. 10D

Bit Plane S-1: LL | HL2 | LH2
Bit Plane S-2: LL | ...
Bit Plane 0: LL | HL2 | LH2 | HH2 | HL1 | LH1 | HH1

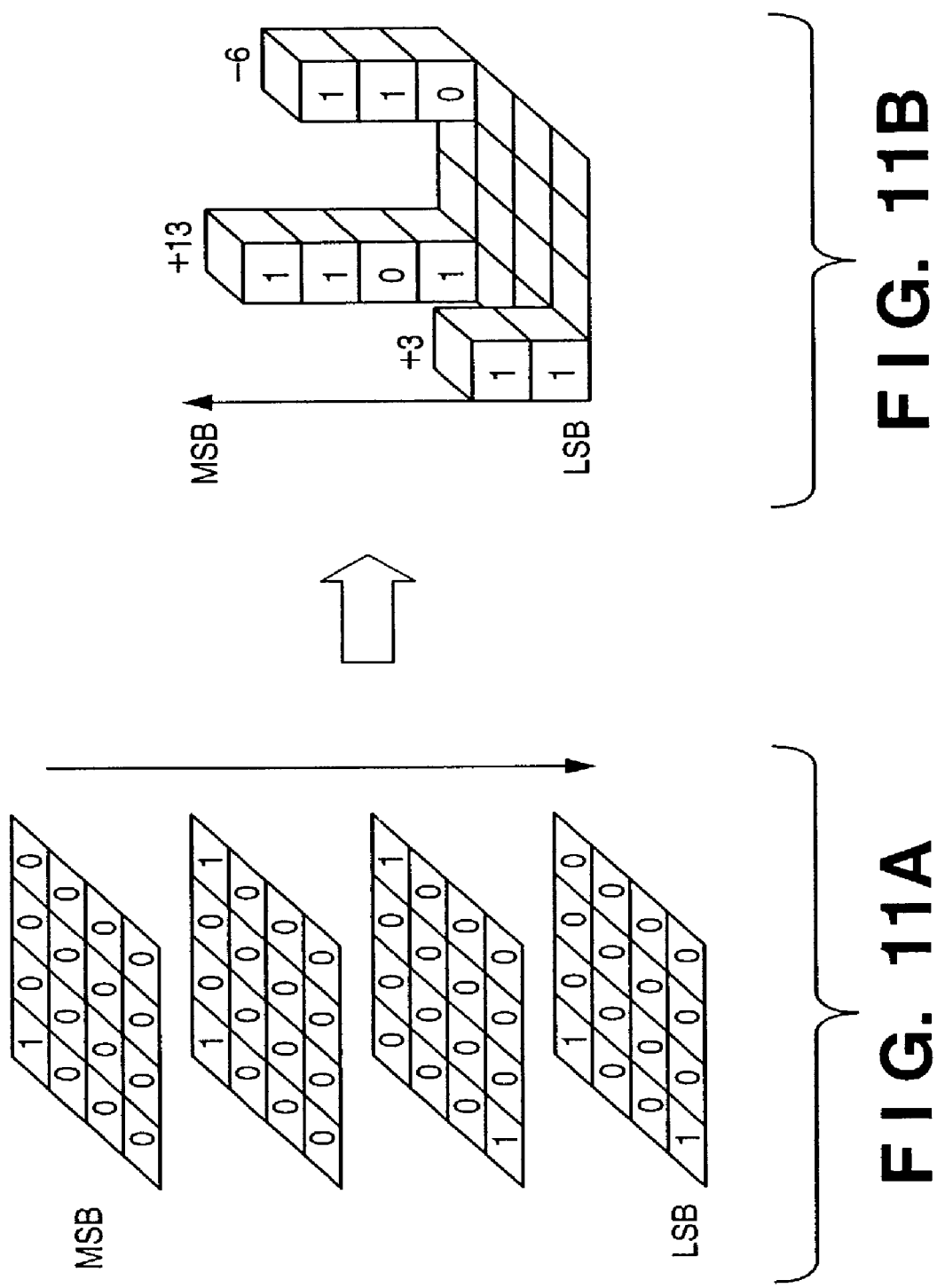

FIG. 14

| | |
|---|---|
| NUMBER OF DIVISIONS OF DISCRETE WAVELET CONVERSION | 2 |
| SIZE OF CODE BLOCK | 64 |
| PRESENCE OR ABSENCE OF ARITHMETIC CODING OF LOWER BIT PLANE | PRESENT |
| PROGRESSIVE ORDER | RLCP |

FIG. 15A

| | CODE STREAM | NORMALIZATION METHOD | JUDGMENT |
|---|---|---|---|
| NUMBER OF DIVISIONS OF DISCRETE WAVELET CONVERSION | 2 | 2 | ○ |
| SIZE OF CODE BLOCK | 64 | 64 | ○ |
| PRESENCE OR ABSENCE OF ENTROPY CODING OF LOWER BIT PLANE | PRESENT | PRESENT | ○ |
| PROGRESSIVE ORDER | LRCP | RLCP | × |

FIG. 15B

| | CODE STREAM | NORMALIZATION METHOD | JUDGMENT |
|---|---|---|---|
| NUMBER OF DIVISIONS OF DISCRETE WAVELET CONVERSION | 2 | 2 | ○ |
| SIZE OF CODE BLOCK | 64 | 64 | ○ |
| PRESENCE OR ABSENCE OF ENTROPY CODING OF LOWER BIT PLANE | PRESENT | PRESENT | × |
| PROGRESSIVE ORDER | RLCP | RLCP | ○ |

INFORMATION PROCESSING METHOD AND INFORMATION PROCESSING APPARATUS

FIELD OF THE INVENTION

The present invention relates to an information processing method and an image processing apparatus for verifying presence or absence of falsification with respect to compression-coded data which has been subjected to lossless compression coding.

BACKGROUND OF THE INVENTION

In recent years, various kinds of information such as characters, images, and voices are digitized to be used in accordance with rapid development and spread of computers and networks. Digitized information (digital data) has characteristics that it is not affected by deterioration due to aging or the like and can be preserved in a perfect state forever, and on the other hand, it is possible to subject the data to editing or processing easily.

The characteristic that editing and processing of the digital data is easy is useful for users. However, for example, reliability of digital data is low compared with conventional analog data for insurance companies handling photographs of evidence for settlement of accidents, construction companies handling records of progress in building sites, and the like. This leads to a problem in that the digital data is poor in admissibility as evidence.

Thus, there has been proposed an apparatus or a system which, in the case in which the digital data is falsified or forged, detects the falsification or the forgery. For example, a system utilizing digital signature is well known as a system for detecting falsification and forgery of the digital data.

Here, the digital signature means a function with which a transmission side sends object data together with signature data (digital signature data) corresponding to the object data and a reception side verifies this signature data, thereby confirming legality of the object data.

For example, processing from generating digital signature data using a Hash function and a public key cipher on the transmission side to confirming legality of this digital signature data on the reception side is carried out as described below.

First, assuming that a secret key is Ks and a public key (decryption key) is Kp, the transmission side (origination side) compresses plain text data M with the Hash function, and executes arithmetic operation processing for calculating an output h of a constant length (e.g., 128 bits).

Next, the transmission side converts the output h with the secret key Ks and executes arithmetic operation processing for generating a result of the conversion as digital signature data s, that is, arithmetic operation processing in accordance with expression D (Ks, H)=s. Then, the transmission side sends the digital signature data s and the plain text data M to the reception side.

The reception side executes arithmetic operation processing for converting the digital signature data s sent from the transmission side with the public key Kp, that is, arithmetic operation processing in accordance with expression E (Kp, s)=E (Kp, D (Ks, h"))=h", andarithmetic operation processing for compressing plan text data M' sent from the transmission side (received plain text data is assumed to be M' because the plain text data M sent on the transmission side may be falsified) with the same function as the Hash function used on the transmission side to calculate h'. In the case in which h' and h", which are results of the arithmetic operation processing, coincide with each other, the reception side determines that the received plain data text M' is legal data. That is, in the case in which the plan text data M is falsified between the transmission side and the reception side, this falsification can be detected because h' and h" do not coincide with each other.

In this case, it is possible that, if the digital signature data s is also falsified in addition to the falsification of the plain text data M, the falsification cannot be detected. However, the possibility is denied because it is necessary to find the plain text data M from the output h and due to unidirectionality of the Hash function to be described later in detail.

It becomes possible to perform authentication of data correctly according to the digital signature using the public key cipher and the Hash function as described above.

The public key cipher and the Hash function will be described. First, the Hash function is a function which is used for, for example, speeding up generation of digital signature, and has a function for transforming the plain text data M of an arbitrary length into the data h of a fixed length. This output data h is called a Hash value (or message digest, or digital fingerprint) of the plain text data M.

Examples of characteristics required of the Hash function include characteristics that unidirectionality and collision tolerance are required.

The unidirectionality is a characteristic that, when the data h is given, it is difficult to calculate the plain text data M satisfying h=H (M) in terms of computational complexity. The collision tolerance is a characteristic that, when the plain text data M is given, it is difficult to calculate the plain text data M' (M≠M') satisfying H (M)=H (M') in terms of computational complexity and it is difficult to calculate the plain text data M and M' satisfying H (M)=H (M') and M≠M' in terms of computational complexity.

As the Hash function, there are known, for example, MD-2, MD-4, MD-5, SHA-1, RIPEMD-128, or RIPEMD-160. These algorisms have been laid open to the public.

On the other hand, a public key cryptosystem is a cryptosystem in which an encryption key and a decryption key are different and the encryption key is laid open and the decryption key is kept secret. Examples of characteristics of such a public key cryptosystem include characteristics (a) to (c) described below.

(a) Since the encryption key and the decryption key are different and the encryption key can be laid open to the public, it is unnecessary to deliver the encryption key secretly and key delivery is easy.

(b) Since an encryption key of each user is laid open, the user only has to store the user's own decryption key in secret.

(c) An authentication function can be realized with which the reception side can confirm that the transmission side of a communication text (plain text data M) is not a pretender and that the communication text is not falsified.

More specifically, for example, if an encryption operation using the public encryption key (public key) Kp with respect to the plain text data M is represented by E (Kp, M) and a decryption operation using the secret decryption key (secret key) Ks with respect to the plain text data M' encrypted by this encryption operation is represented by D (Ks, M'), first, a public key encryption algorism satisfies two conditions (1) and (2) described below.

(1) Calculation of E (Kp, M) is easy when the public key Kp is given, and calculation of D (Ks, M') is easy when the secret key Ks is given.

(2) If the secret key Ks is unknown, it is difficult to determine the plain text data M in terms of computational complexity even if the public key Kp, calculation procedures for E (Kp, M), and M' (=E (Kp, M)) are known. If the public key encryption algorism satisfies a condition (3) described below in addition to the conditions (1) and (2), secret communication becomes possible.

(3) E (Kp, M) can be defined for all the plain text data M, and D (Ks, E (HP, M))=M is established. That is, since the public key Kp is laid open, anybody can calculate E (Kp, M). However, only a user himself/herself having the secret key Ks can calculate D (Ks, E (Hp, M)) to obtain the plain text data M.

In addition, if the public key encryption algorism satisfies a condition (4) described below in addition to the conditions (1) and (2), authentication communication can be realized.

(4) D (Ks, M') can be defined for all the plain text data M', and E (Kp, D (Ks, M'))=M' is established. That is, only a user himself/herself having the secret key Ks can calculate D (Ks, M') and, even if another user uses a false secret key Ks' to calculate D (Ks', M) and pretends to be the user himself/herself having the secret key Ks, since E (Kp, D (Ks', M'))≠M', the reception side can confirm that the received data is illegal. In addition, even if D (Ks, M') is falsified, since E (Kp, D (Ks, M')')≠M', the reception side can confirm that the received data is illegal.

Representative examples of a cryptosystem capable of carrying out the secret communication and authentication communication as described above include RSA encryption, R encryption, W encryption, or the like. For example, encryption and decryption in the RSA cryptosystem, which is used most frequently presently, are represented by expressions as described below.

Encryption conversion using an encryption key (e, n) is represented by expression C=M (e mod n), and conversion for decrypting this with a decryption key (d, n) is represented by expression M=C (d mod n).

In addition, n=p·q, where p and q are prime numbers of different sizes, respectively.

However, since the RSA cryptosystem requires an exponential operation and a remainder operation as indicated in the above expressions, an amount of operation becomes enormous compared with a common key cipher such as DES, and it is difficult to speed up processing for the encryption and the decryption.

A system for verifying, for example, falsification and forgery of image data utilizing the digital signature described above is disclosed in U.S. Pat. No. 5,499,294 and the like. This system is constituted such that processing as described below is carried out.

First, a Hash value of image data to be an object (object image data) is calculated and the Hash value is encrypted with a secret key, whereby a digital signature for the object image data is generated. Next, in order to verify whether or not the object image data is falsified, the digital signature for the object image data is decrypted with a public key, whereby a Hash value is calculated. Moreover, a Hash value is also calculated from the object image data. Then, the Hash value obtained by decrypting the digital signature for the object image data and the Hash value obtained from the object image data are compared. As a result of this comparison, if both the Hash values coincide with each other, it is verified that the object image data is neither falsified nor forged.

The technique described in U.S. Pat. No. 5,499,294 is also applicable to the case in which data to be an object of signature is not image data and the image data is compression-coded data. Since signature processing has a characteristic that a processing time increases in proportion to a capacity of data to be inputted (signed data), it is preferable to apply the signature processing to the compression-coded data from the viewpoint of reducing a signature processing time.

Incidentally, the compression coding can be classified into lossy coding involving image deterioration and lossless coding not involving image deterioration in the case in which image data before coding and image data after decoding are compared. The lossless coding does not involve image deterioration but has a degree of freedom in coding parameters. In the case in which lossless coding processing is executed with respect to certain image data using coding parameters different from each other, two different compression-coded image data is generated (images obtained by decoding the two image data are completely the same). This poses a problem because, in the case in which lossless compression-coded data is used as signed data, the data may be considered falsified even if contents of the images are not falsified.

The present invention has been devised in view of the above problems, and it is an object of the present invention to provide a technique for verifying presence or absence of falsification with respect to compression-coded data subjected to lossless compression coding using compression coding parameters different from each other.

SUMMARY OF THE INVENTION

In order to achieve the above object, for example, an information processing method of the present invention comprises the following arrangement.

That is, an information processing method performed by a verification device which verifies whether or not falsification has been applied to compression-coded data to be outputted from a coding device, comprising:

a holding step of holding verification data which is obtained based upon compression-coded data in a normalized state generated in the coding device;

an input step of inputting compression-coded data, which is obtained by coding coding object data in the coding device, and normalization information, which indicates a reference for converting the compression-coded data into the normalized state, from the coding device;

a normalization step of normalizing the compression-coded data, which is inputted in the input step, using the normalization information;

a first calculation step of calculating a first value based upon the verification data;

a second calculation step of calculating a second value based upon the compression-coded data normalized in the normalization step; and a determination step of determining whether or not falsification has been applied to the compression-coded data, which is inputted in the input step, according to a result of comparison of the first value and the second value.

In order to achieve the above object, for example, an information processing apparatus of the present invention comprises the following arrangement.

That is, an information processing apparatus for verifying whether or not falsification has been applied to compression-coded data to be outputted from a coding device, comprising:

holding means for holding verification data which is obtained based upon compression-coded data in a normalized state generated in the coding device;

input means for inputting compression-coded data, which is obtained by coding coding object data in the coding device, and normalization information, which indicates a reference for converting the compression-coded data into the normalized state, from the coding device;

normalization means for normalizing the compression-coded data, which is inputted by the input means, using the normalization information;

first calculation means for calculating a first value based upon the verification data;

second calculation means for calculating a second value based upon the compression-coded data normalized by the normalization means; and determination means for determining whether or not falsification has been applied to the compression-coded data, which is inputted by the input means, according to a result of comparison of the first value and the second value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A is a diagram for explaining operations of an entropy coding unit 63;

FIG. 9B is a diagram for explaining operations of an entropy coding unit 63;

FIG. 10A is a diagram showing a schematic structure of a code string generated in a code output unit 64;

FIG. 10B is a diagram showing a schematic structure of a code string generated in the code output unit 64;

FIG. 10C is a diagram showing a schematic structure of a code string generated in the code output unit 64;

FIG. 10D is a diagram showing a schematic structure of a code string generated in the code output unit 64;

FIG. 11A is a diagram showing a flow of processing for sequentially decoding one area of a sub-band to be an object of decoding by a unit of bit plane and finally decoding a quantization index;

FIG. 11B is a diagram showing a flow of processing for sequentially decoding one area of a sub-band to be an object of decoding by a unit of bit plane and finally decoding a quantization index;

FIG. 14 is a table showing table data indicating compression coding parameters;

FIG. 15A is a table showing a result of comparing compression coding parameters of a code stream and compression coding parameters in accordance with inputted data indicating a normalization method (data included in data indicating a normalization method);

FIG. 15B is a table showing a result of comparing compression coding parameters of a code stream and compression coding parameters in accordance with inputted data indicating a normalization method (data included in data indicating a normalization method);

DETAILED DESCRIPTION OF THE PREFERRED EMBODIMENTS

[First Embodiment]

A signature device and a verification device in accordance with this embodiment will be hereinafter described.

<Signature Device>

Figure 1:
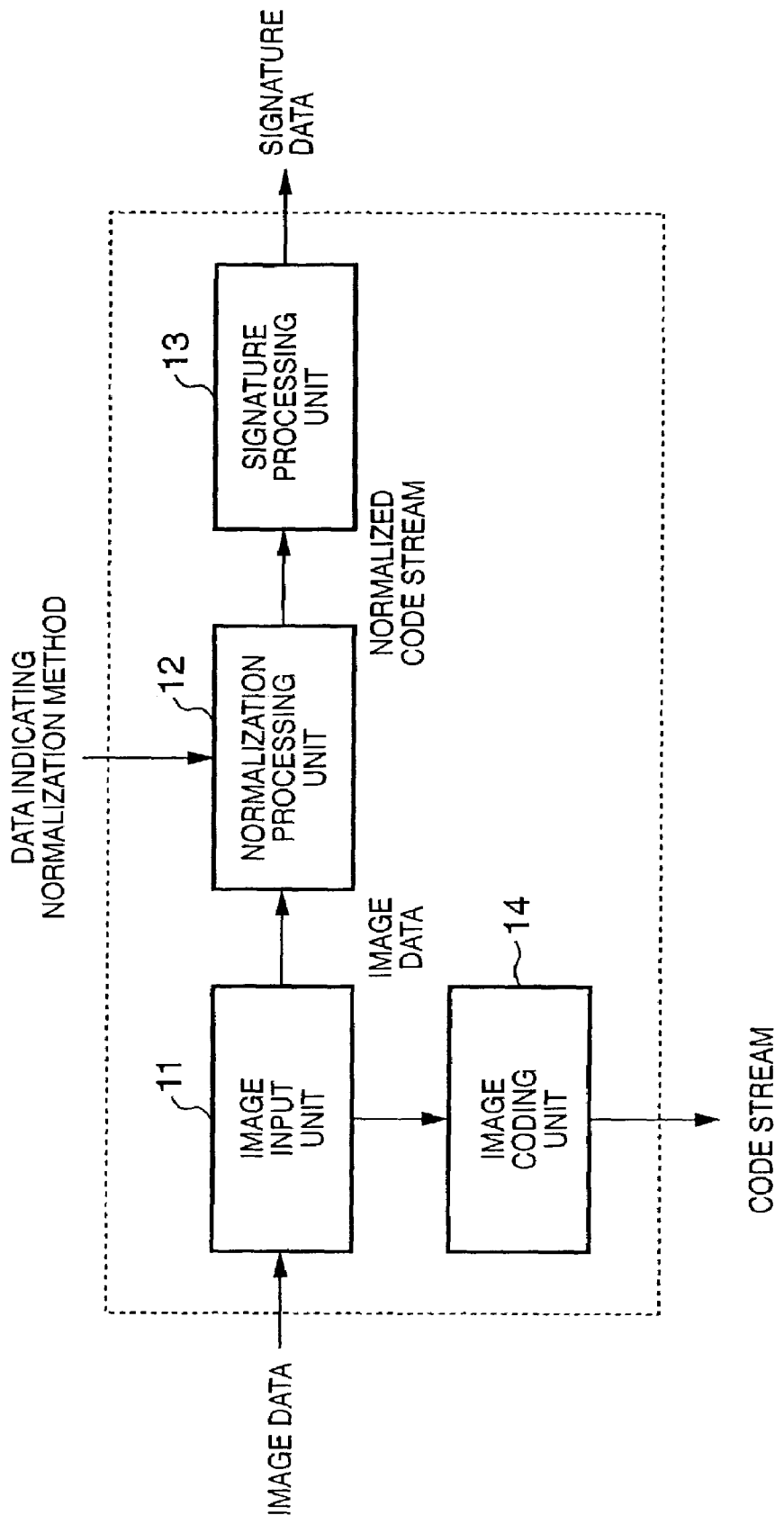
FIG. 1 is a block diagram showing a functional structure of a signature device in accordance with a first embodiment of the present invention.

FIG. 1 is a block diagram showing a functional structure of the signature device in accordance with this embodiment. As shown in the figure, the signature device includes an image input unit 11, a normalization processing unit 12, a signature processing unit 13, and an image coding processing unit 14. Note that functions of the respective units shown in the figure may be realized by a software program. This is because, by causing a computer to read a program having the functions of the respective units, this computer becomes capable of realizing the functions of the respective units.

First, pixel signals forming an image to be an object of signature processing are inputted to the image input unit 11 in the order of raster scan. Thereafter, the respective pixel signals are inputted to the normalization processing unit 12 and the image coding unit 14. Although an image signal represents a monochrome multilevel image in the following description, if a plurality of color components of a color image or the like are coded, it is sufficient to process RGB color components or luminance and chromaticity components as the monochrome component.

To the normalization processing unit 12, image signals from the image input unit 11 in the earlier stage are inputted and data indicating a predetermined normalization method is also inputted from the outside. Then, the normalization processing unit 12 applies normalization processing in accordance with the predetermined normalization method to the image signals and outputs a normalized code stream (compression-coded data). In this embodiment, image compression coding processing is executed in a process of normalization. Moreover, at the time of compression coding, the inputted normalization method is referred to, and the compression coding processing is executed in accordance with the normalization method. The compression coding processing executed in the normalization processing unit 12 is the same as the compression coding processing in the image coding unit 14 except that compression coding parameters are different. Details of the compression coding processing will be described later.

The code stream outputted from the normalization processing unit 12 becomes a normalized code stream through the above processing.

As the normalization method, a coding method and several parameters are designated. For example, in the case of an image coding system described later, the number of divisions of discrete wavelet conversion, a type of a progressive order, presence or absence of execution of arithmetic coding of a lower bit plane, a size of a code block, and the like are designated. Details of these compression coding parameters will be described later. Note that it is evident that the following description is not limited to these normalization method and compression coding parameters and various normalization methods and compression coding parameters can be designated.

Moreover, in this embodiment, the normalization method is described as including various compression coding parameters. However, the present invention is not limited to this and, for example, it is also possible to determine several normalization methods, in which various compression coding parameters are written, as classes in advance. A normalization method is determined as a class and contents of the class is shared by the signature processing unit 13 and a verification processing unit of a verification device described later in advance, whereby it is sufficient to send an identifier, which indicates the class from the signature processing unit 13 to the verification processing unit of the verification device described later, as the normalization method. This is efficient.

These designated parameters are sent to the verification processing unit of the verification device described later as data shown in FIG. 14. FIG. 14 is a table showing table data indicating compression coding parameters. As shown in FIG. 14, the designated parameters are arranged in the order of procedures for image coding and recorded by the normalization processing unit 12. The coding parameters are arranged in the order of procedures for image coding and recorded in this way and outputted to the verification device described later, whereby it is possible to efficiently execute processing in the normalization processing in the verification processing unit of the verification device described later.

Referring to FIG. 1 again, the normalization code stream outputted from the normalization processing unit 12 is inputted to the signature processing unit 13, and the signature processing unit 13 generates signature data for the inputted normalization code stream. In this embodiment, a system in the case in which the public key cryptosystem is used will be described as a method of signature processing executed in the signature processing unit 13. However, the present invention is not limited to this, and various systems such as a signature system using a secret key system are applicable.

Figure 5:
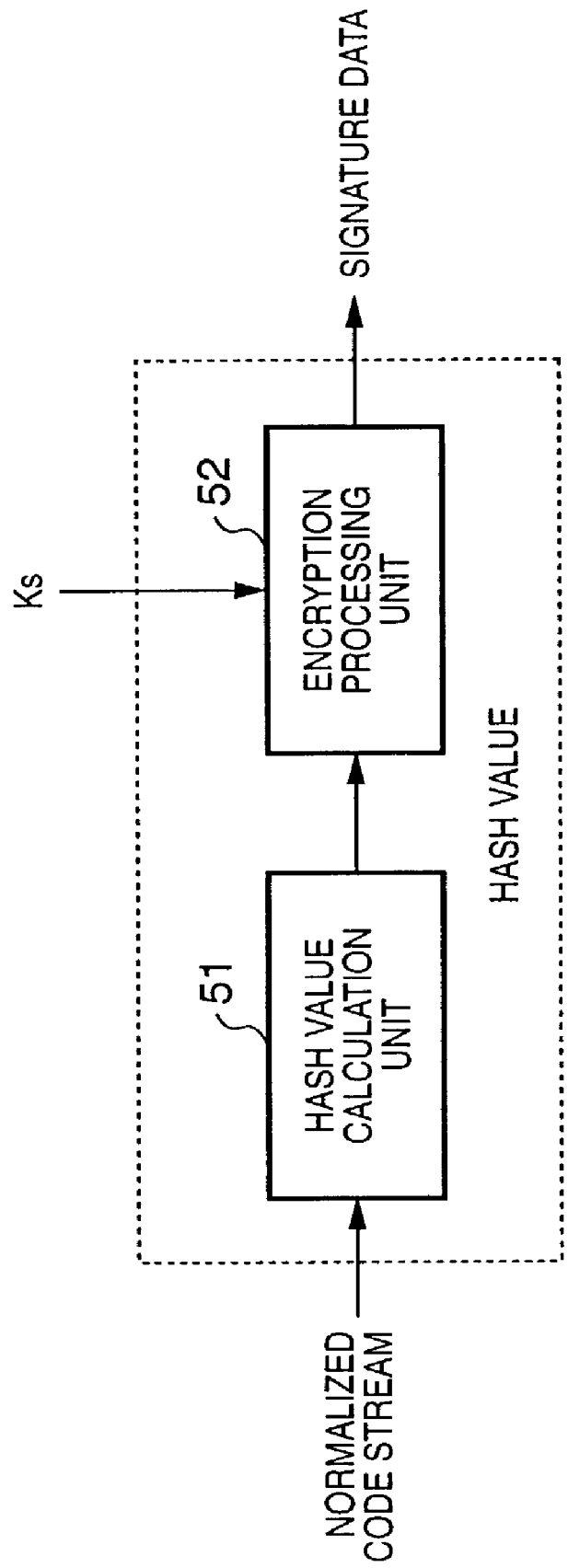
FIG. 5 is a block diagram showing a functional structure of a signature processing unit 13 in the case in which a public key encryption system is used.

FIG. 5 shows a functional structure of the signature processing unit 13 in the case in which the public key cryptosystem is used. As shown in FIG. 5, the signature processing unit in this embodiment includes a Hash value calculation unit 51 and an encryption processing unit 52. A normalization code stream is inputted to the Hash value calculation unit 51, and a Hash value of the inputted normalization code stream is calculated. The calculated Hash value is outputted to the encryption processing unit 52. The Hash value and a secret key Ks (corresponding to a public key Kp described later) in the public key system are inputted to the encryption processing unit 52. The encryption processing unit 52 subjects the Hash value to encryption processing using the secret key Ks, thereby generating signature data. Note that the generated signature data and the above-described table data may be included in a code stream to be outputted in the image coding unit 14 described later or may be sent to the verification processing unit of the verification device described later using means different from the code stream.

Next, functions of the image coding unit 14 will be described. The image coding unit 14 applies compression coding to inputted image data to generate a code stream. The generated code stream is inputted to the verification device described later. Details of image compression coding processing will be described later.

Figure 17:
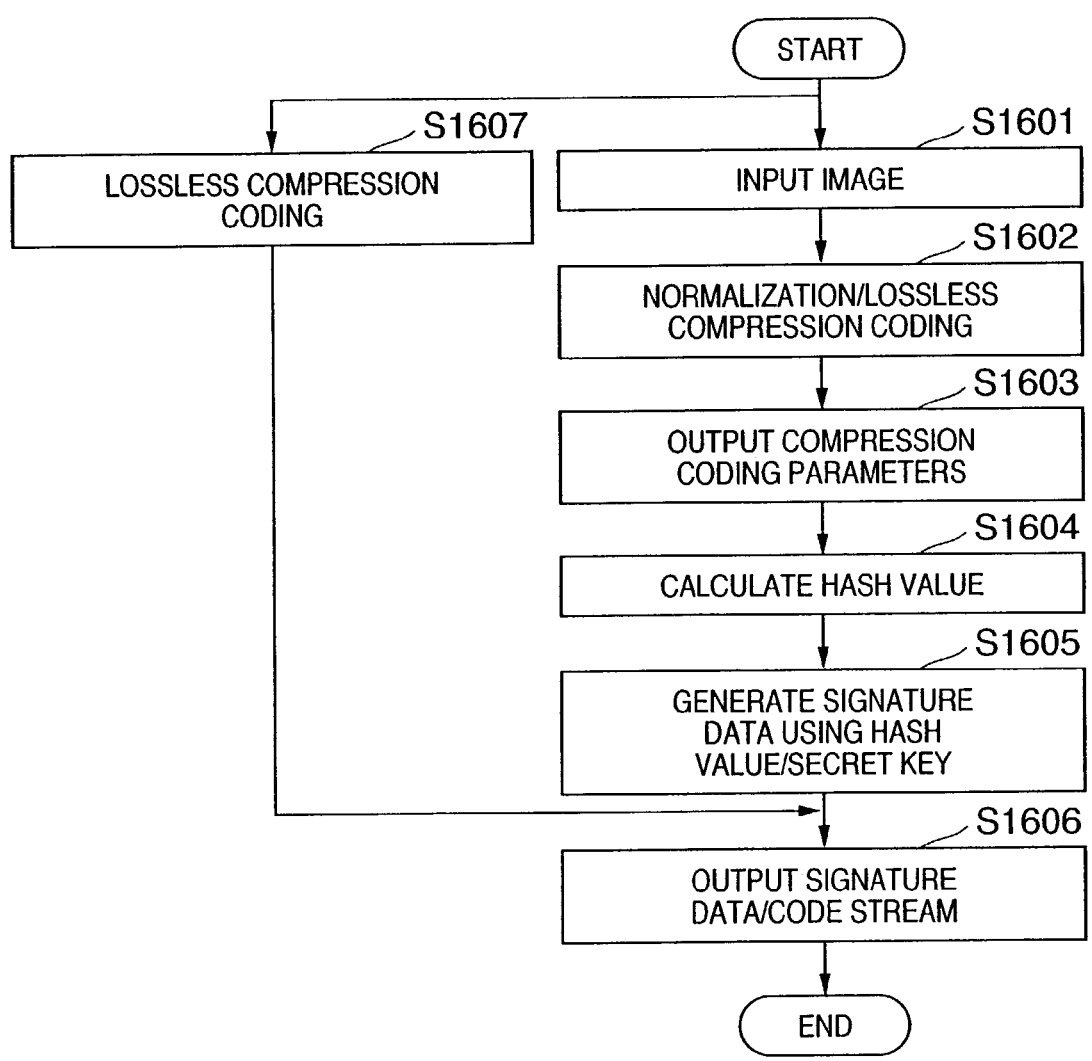
FIG. 17 is a flowchart of signature processing performed by the signature device in accordance with the first embodiment of the present invention.

FIG. 17 shows a flowchart of the signature processing performed by the signature device described above. First, the image input unit 11 inputs image data of an object of signature (image data of an object of compression coding) and sends the image data to the image coding unit 14 and the normalization processing unit 12 (step S1601). On the other hand, the image coding unit 14 applies compression coding to the image data inputted in step S1601 using compression coding parameters different from compression coding parameters used by the normalization processing unit 12 and generates a code stream (step S1607). Next, the normalization processing unit 12 applies the above-described normalization processing and, then, the compression coding processing to the image data and generates a normalized code stream (step S1602). In addition, as illustrated in FIG. 14, coding parameters are recorded (step S1603).

Next, the signature processing unit 13 calculates a Hash value of the normalized code stream (step S1604) and generates signature data of the normalized code stream using the calculated Hash value and the secret key (step S1605). Then, the signature processing unit 13 outputs the generated signature data and the code stream generated in step S1607 to the verification device described later (step S1606).

The signature device in this embodiment has been described so far. However, it is not always necessary to provide the image coding unit 14 in the signature device. That is, the image coding unit 14 is a unit for inputting a code stream in the verification processing unit of the verification device described later and for example, as long as this object can be attained, this image coding unit 14 may be provided in the verification device as a function for inputting a code stream in the verification device or may be provided separately from the signature device and the verification device to input a code stream generated by this device into the verification device. In that case, the processing in step S1607 is performed by a unit equivalent to the image coding unit 14. Further, in step S1606, only the signature data is outputted and the code stream is outputted by the unit equivalent to the image coding unit 14.

<Verification Device>

Figure 2:
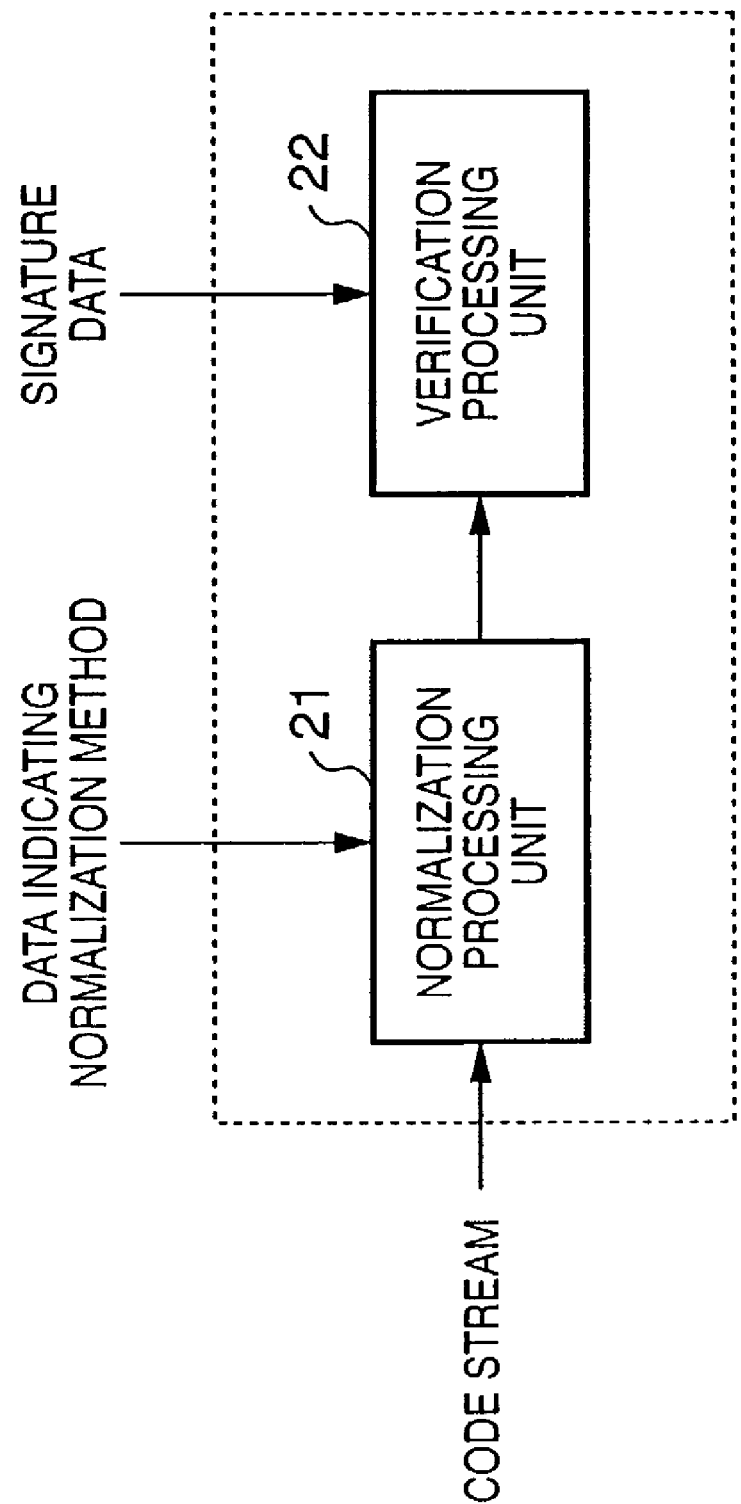
FIG. 2 is a block diagram showing a functional structure of a verification device in accordance with the first embodiment of the present invention.

FIG. 2 is a block diagram showing a functional structure of the verification device. As shown in the figure, the verification device includes a normalization processing unit 21 and a verification processing unit 22. Note that functions of the units shown in this figure may be realized by a software program. That is, this is because, by causing a computer to read a program having the functions of the respective units, this computer becomes capable of realizing the functions of the respective units.

The verification device in accordance with this embodiment is a device for verifying presence or absence of falsification or the like with respect to a code stream generated by the above-described signature device. Thus, a code stream to be an object of verification and data indicating the above-described normalization method are inputted to the normalization processing unit 21. Then, the normalization processing unit 21 performs normalization processing of the code stream in accordance with the inputted normalization method, and generates and outputs a normalized code stream. In the case in which the data indicating the inputted normalization method is the same as the above-described normalization method designated in the signature device, it is possible to perform the normalization processing correctly. Here, the normalization processing unit 21 will be described more in detail with reference to FIG. 3.

Figure 3:
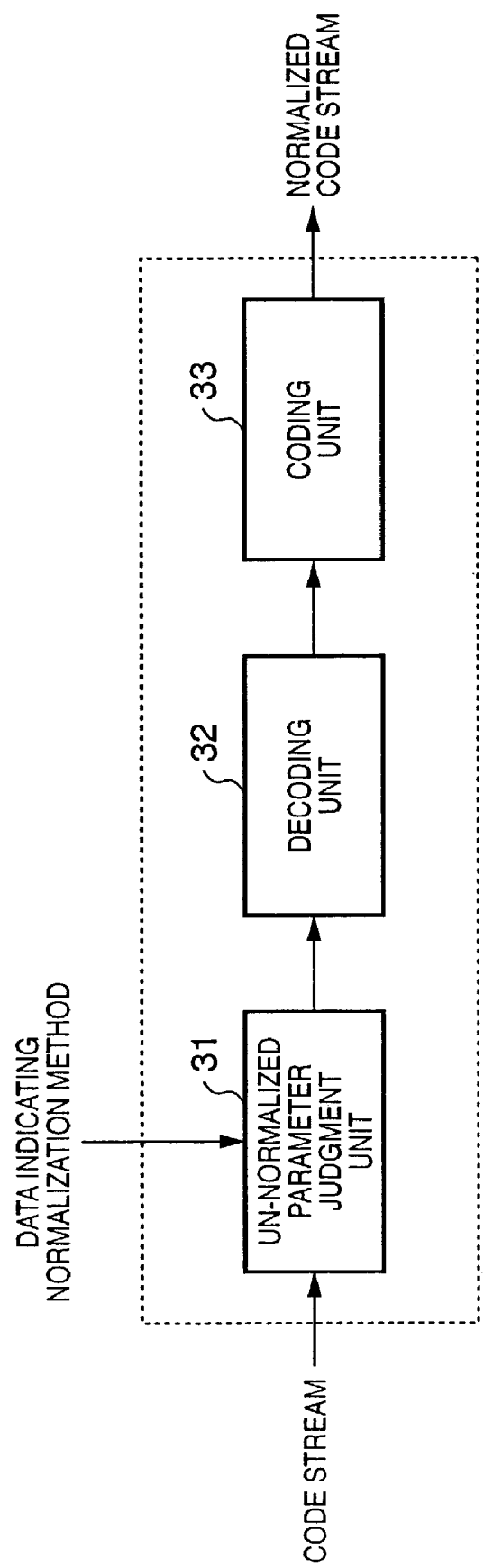
FIG. 3 is a block diagram showing a functional structure of a normalization processing unit 21.

FIG. 3 is a block diagram showing a functional structure of the normalization processing unit 21. As shown in this figure, the normalization processing unit includes an un-normalized parameter judgment unit 31, a decoding unit 32, and a coding unit 33.

The code stream (code stream which is not normalized, and generated and outputted by the image coding unit 14 or the like) and the data indicating a normalization method are inputted to the un-normalized parameter judgment unit 31. The un-normalized parameter judgment unit 31 uses the inputted data indicating a normalization method to judge which parameter is not normalized in the inputted code stream. Then, the un-normalized parameter judgment unit 31 outputs a parameter, which is judged as not normalized (un-normalized parameter), to the decoding unit 32 in the later stage.

Here, a specific example of un-normalized parameter judgment processing will be described. First, compression coding parameters of the inputted code stream is found from the code stream. The compression coding parameters are written in a header or the like and can be found by analyzing the header. As the compression coding parameters, the number of divisions of discrete wavelet conversion, a type of a progressive order, presence or absence of execution of entropy coding of a lower bit plane, a size of a code block, and the like as described above are found.

The respective compression coding parameters calculated in this way and the inputted data indicating a normalization method are compared to find different parameters. For example, as shown in FIGS. 15A and 15B, a result of comparison for each coding parameter is outputted. FIGS. 15A and 15B are tables showing results of comparing the respective compression coding parameters of a code stream and the respective compression coding parameters in accordance with the inputted data indicating a normalization method (data included in the data indicating a normalization method).

FIG. 15A shows an example in which only the order of a progressive order is different among the compression coding parameters. FIG. 15B shows an example in which only the presence or absence of execution of entropy coding of a lower bit plane is different among the compression coding parameters.

The code stream (not normalized) and the un-normalized parameters are inputted to the decoding unit 32. The decoding unit 32 decodes the inputted code stream up to a predetermined stage based upon the un-normalized parameters, and decoded data is outputted. In the decoding unit 32, it is not always necessary to decode the inputted code stream until it becomes image data. That is, the decoding unit 32 decodes the inputted code stream up to a level for allowing parts relating to parts indicated by the un-normalized parameters to be normalized. In this way, the compression coding parameters are recorded in the order of procedures of compression coding, whereby there is an advantage that it is easily seen to which stage the decoding processing should be executed.

Referring to FIG. 3 again, the data decoded to the predetermined stage in the decoding unit 32 in the earlier stage and the un-normalized parameters are inputted to the coding unit 33. The coding unit 33 executes coding processing after the predetermined stage with respect to the inputted data and outputs an obtained code stream as a normalized code stream. In the coding unit 33, only the coding processing corresponding to the decoding processing executed in the decoding unit 32 in the earlier stage is executed. For example, in the case in which the un-normalized parameters shown in FIG. 15A are inputted, the coding unit 33 generates a code stream with the progressive order set to the order of LRCP. On the other hand, in the case in which the un-normalized parameters shown in FIG. 15B are inputted, the coding unit 33 executes the entropy coding processing with the presence or absence of execution of the entropy coding of a lower bit plate set to "absent" and further generates a code stream such that the progressive order is in the order of RLCP.

Next, processing in the verification processing unit 22 will be described. A normalized code stream and signature data are inputted to the verification processing unit 22. The verification processing unit 22 verifies whether or not the code stream inputted from the signature device is falsified. Here, the verification processing unit 22 will be described with reference to FIG. 6.

Figure 6:
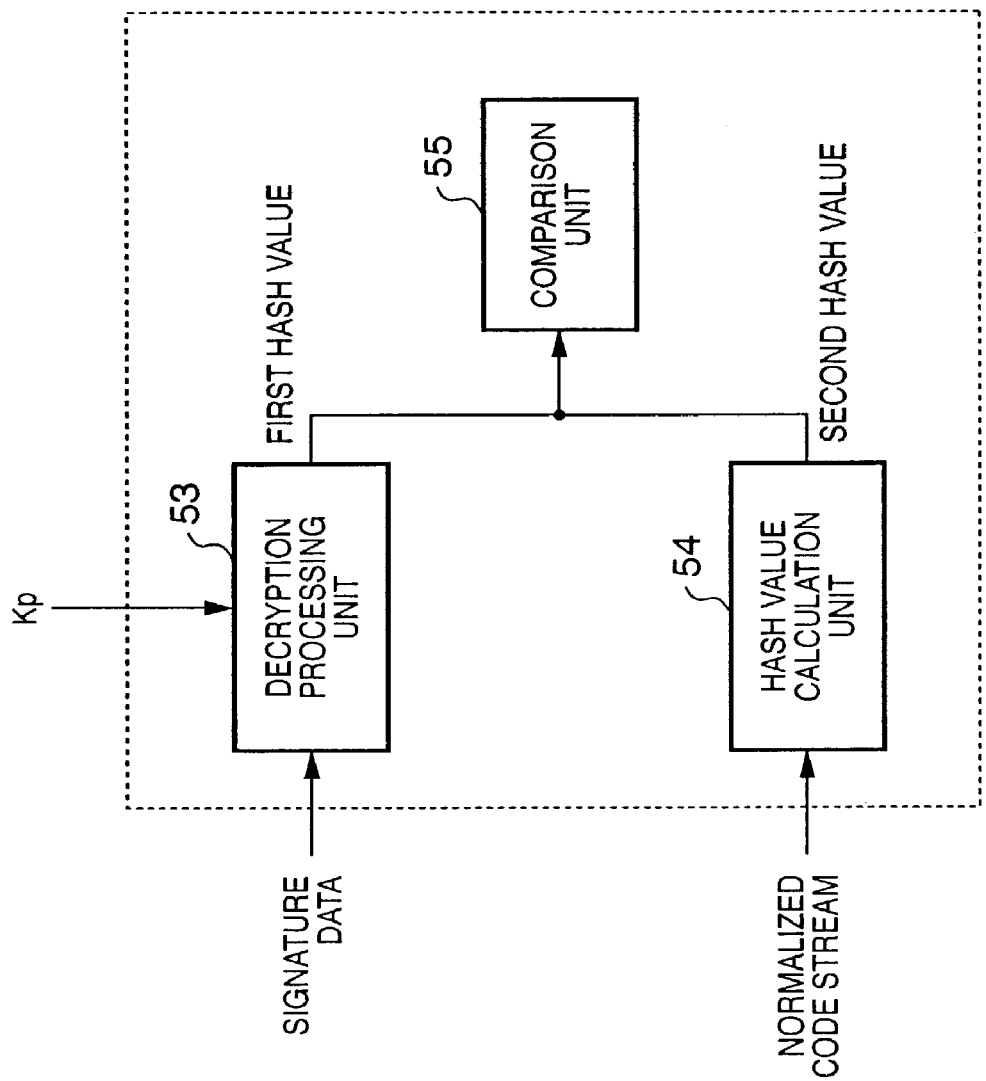
FIG. 6 is a block diagram showing a functional structure of a verification processing unit 22.

FIG. 6 is a block diagram showing a functional structure of the verification processing unit 22. As shown in the figure, the verification processing unit 22 includes a decryption processing unit 53, a Hash value calculation unit 54, and a comparison unit 55. Signature data and the public key Kp are inputted to the decryption processing unit 53. The decryption processing unit 53 applies encryption and decryption processing to the signature data using the public key Kp to calculate a Hash value (first Hash value). Data indicating the calculated first Hash value is inputted to the comparison unit 55 in the later stage.

On the other hand, a normalized code stream is inputted to the Hash value calculation unit 54. The Hash value calculation unit 54 calculates a Hash value of the normalized code stream (second Hash value). Data indicating the calculated second Hash value is inputted to the comparison unit 55 in the later stage.

The comparison unit 55 compares the first Hash value and the second Hash value, thereby verifying whether or not the code stream is falsified. That is, if the first Hash value and the second Hash value are equal, the comparison unit 55 judges that the code stream is not falsified and, if the first Hash value and the second Hash value are not equal, the comparison unit 55 judges that the code stream is falsified.

Figure 18:
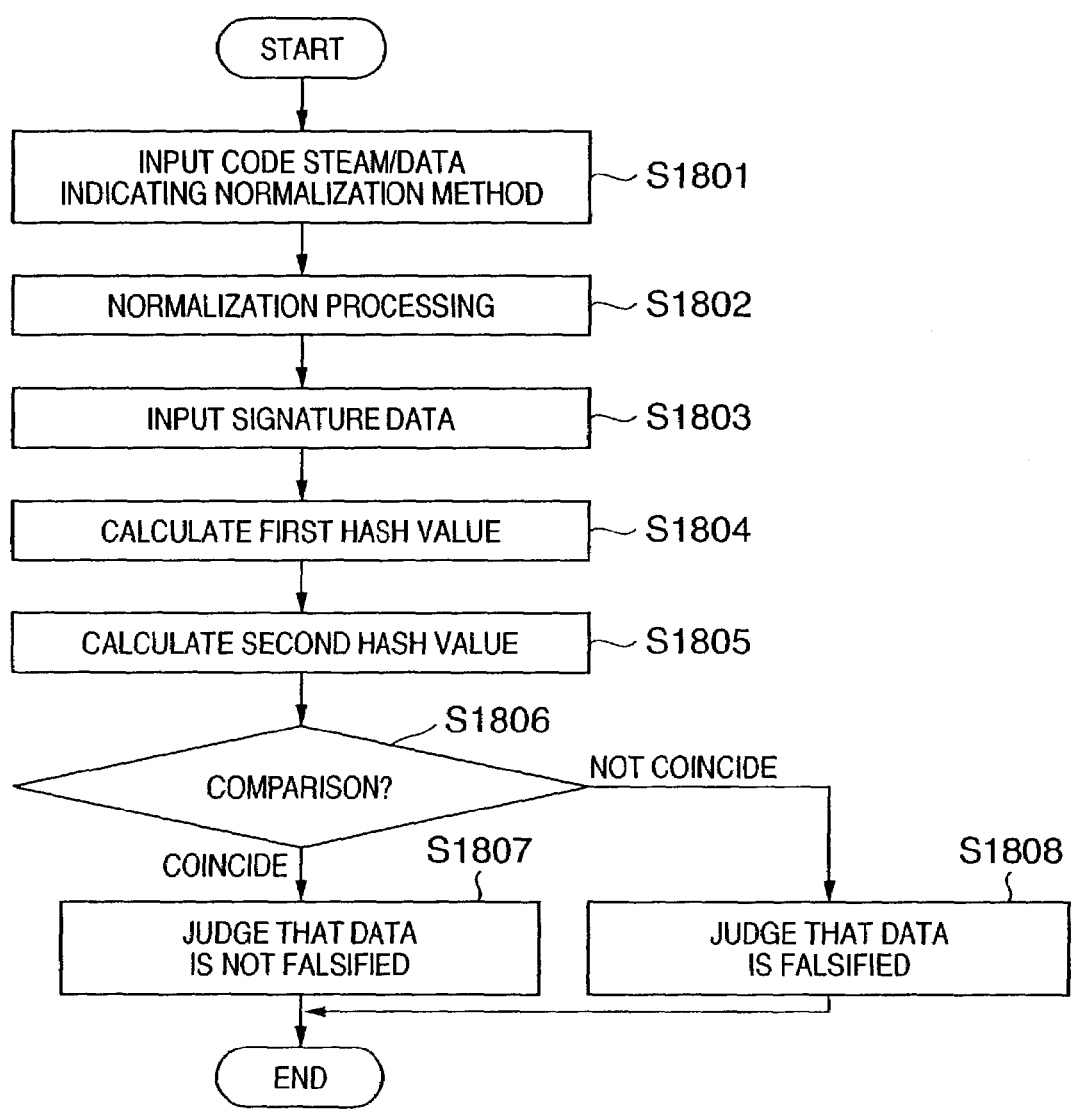
FIG. 18 is a flowchart of verification processing performed by the verification device in accordance with the first embodiment of the present invention.

FIG. 18 shows a flowchart of the above-described verification processing performed by the verification device. First, when a code stream and data indicating a normalization method are inputted from the signature device (step S1801), the normalization processing unit 21 applies the normalization processing to the code stream inputted by the above-described method to generate a normalized code stream (step S1802). Next, when signature data is inputted (step S1803) by the verification processing unit 22, the decryption processing unit 53 applies the encryption and decryption processing to the signature data using the public key Kp to calculate a Hash value (first Hash value) (step S1804). On the other hand, the Hash value calculation unit 54 calculates a Hash value of the normalized code stream (second Hash value) (step S1805). Next, the comparison unit 55 compares the first Hash value and the second Hash value (step S1806) and, if the first Hash value and the second Hash value are equal, advances the processing to step S1807 and judges that the code stream is not falsified (step S1807). On the other hand, if the first Hash value and the second Hash value are not equal, the comparison unit 55 advances the processing to step S1808 and judges that the code stream is falsified (step S1808)

As described above, according to the verification device in accordance with this embodiment, even if code streams are obtained by compression-coding the same compression coding object data using compression coding parameters different from each other, since Hash values of the code streams are found after normalizing all of them, all the Hash values of the respective code streams have the same values. Thus, even if the code streams found by using the compression coding parameters different from each other are used, presence or absence of falsification with respect to the compression coding object data can be verified.

<Image Compression Coding Processing>

Figure 7:
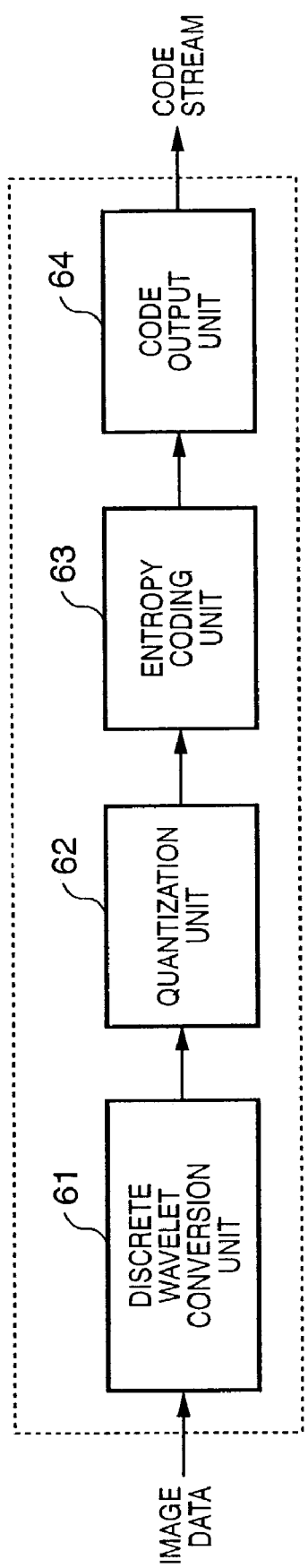
FIG. 7 is a block diagram showing a functional structure of an image coding unit 14 and a coding unit 33.

The compression coding processing performed by the image coding unit 14 and the coding unit 33 of the normalization processing unit 12 will be described in detail. FIG. 7 shows a functional structure of the image coding unit 14 and the coding unit 33. The image coding unit 14 and the coding unit 33 will be hereinafter collectively referred to as a coding device. That is, the coding device will be described in the following description, and this description is applicable to both the image coding unit 14 and the coding unit 33.

As shown in the figure, the image coding device in accordance with this embodiment includes a discrete wavelet conversion unit 61, a quantization unit 62, an entropy coding unit 63, and a code output unit 64.

Figure 8A:
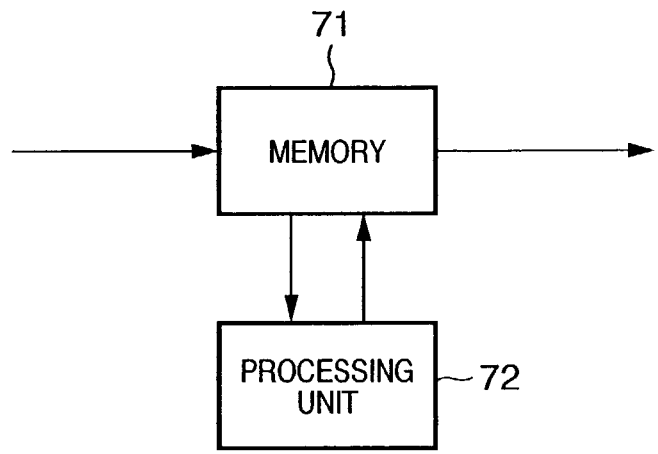
FIG. 8A is a block diagram showing a basic structure of a discrete wavelet conversion unit 61.
Figure 8B:
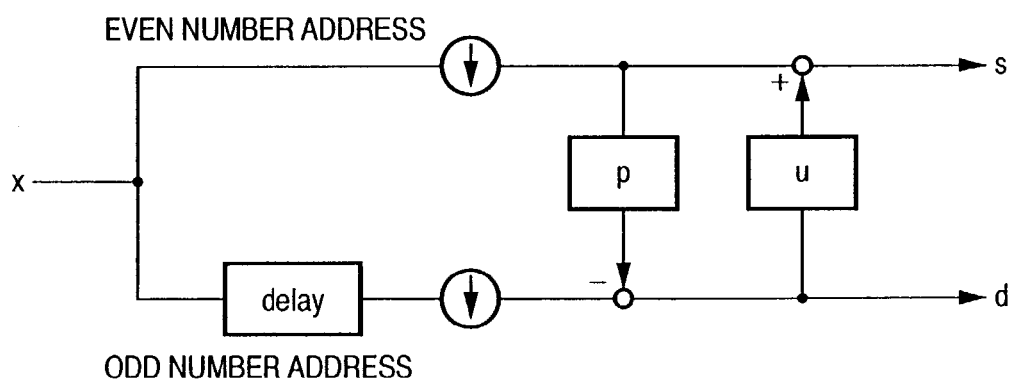
FIG. 8B is a diagram showing a structure for processing in a processing unit 72.

The discrete wavelet conversion unit 61 is a unit for applying two-dimensional discrete wavelet conversion processing to an inputted image signal, and calculating and outputting a conversion factor. FIG. 8A represents a basic structure of the discrete wavelet conversion unit 61. Inputted image signals are stored in a memory 71, sequentially read out by a processing unit 72 and subjected to conversion processing, and written in the memory 71 again. In this embodiment, a structure for processing in the processing unit 72 is as shown in FIG. 8B. In the figure, the inputted image signal is separated into signals of an even number address and an odd number address by a combination of a delay element and a down sampler and is subjected to filter processing by two filters p and u. In the figure, s and d represent a low pass factor and a high pass factor at the time when dissolution of one level is applied to one-dimensional image signals, respectively. It is assumed that these s and d are calculated according to the following expression:

$$d(n)=x(2n+1)-\text{floor}\,((x(2n)+x(2n+2))/2) \quad \text{(Expression 1)}$$

$$s(n)=x(2n)+\text{floor}\,((d(n-1)+d(n))/4) \quad \text{(Expression 2)}$$

Here, x(n) indicates an n-th image signal to be an object of conversion. In addition, floor(x) indicates a maximum integer not exceeding x.

Figure 8C:
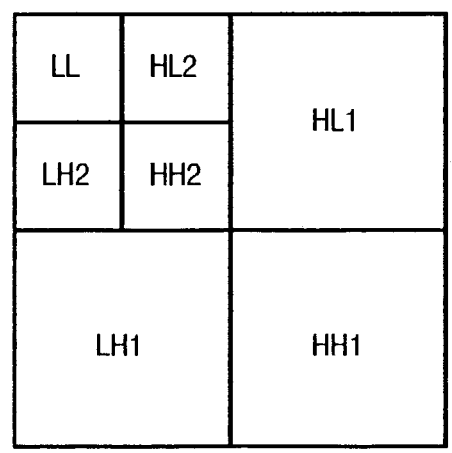
FIG. 8C is a diagram showing an example of a structure of a two-level conversion factor group obtained by two-dimensional conversion processing.

According to the above processing, the one-dimensional discrete wavelet conversion processing is applied to the image signal. The two-dimensional discrete wavelet conversion sequentially performs one-dimensional conversion in horizontal and vertical directions of an image. Since details of this technique are publicly known, a description thereof will be omitted here. FIG. 8C shows an example of a structure of a group of conversion factors of two levels obtained by the two-dimensional conversion processing. In the figure, an image signal is dissolved into factor strings HH1, HL1, LH1, ..., LL of different frequency bands. Note that, in the following description, these factor strings are referred to as sub-bands. A factor of each sub-band is outputted to the quantization unit 62 following the discrete wavelet conversion unit 61.

In the normalization method used in the normalization processing unit 12, the number of levels (number of divisions) of the discrete wavelet conversion in the discrete wavelet conversion unit 61 may be designated.

The quantization unit 62 quantizes an inputted factor with a predetermined quantization step and outputs an index for a value of the quantization. Here, quantization is performed according to the following expressions:

$$q=\text{sign}\,(c)\,\text{floor}\,(\text{abs}(c)/\Delta) \quad \text{(Expression 3)}$$

$$\text{sign}\,(c)\,1;\,c\geq 0 \quad \text{(Expression 4)}$$

$$\text{sign}\,(c)=-1;\,c\leq 0 \quad \text{(Expression 5)}$$

Here, c is a factor to be an object of quantization. In addition, in this embodiment, it is assumed that one is included as a value of Δ. In this case, the quantization is not actually performed, and the conversion factor inputted to the quantization unit 62 is outputted to the entropy coding unit 63 following the quantization unit 62.

Figure 12:
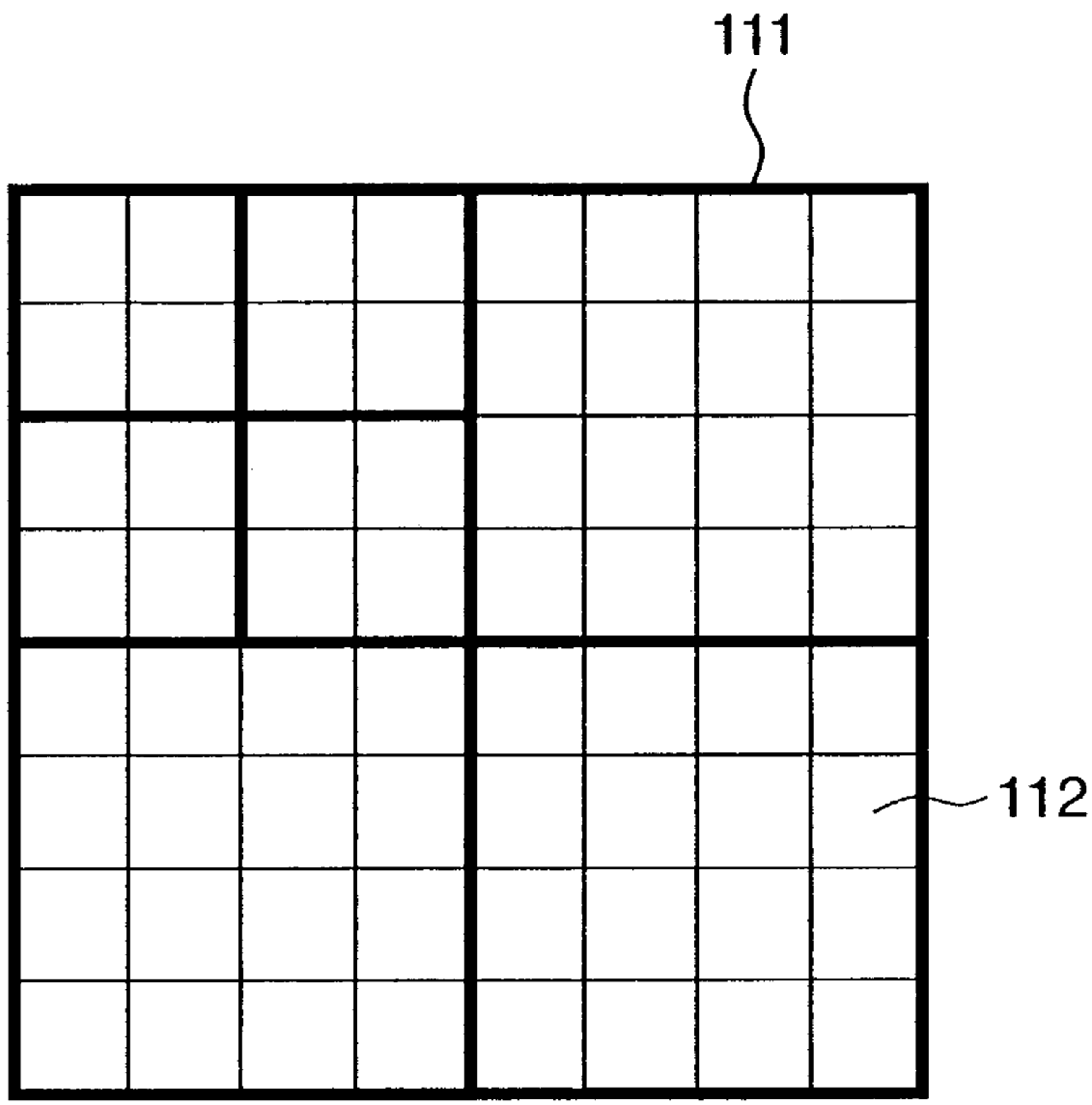
FIG. 12 is a diagram showing an example of division of a code block.

The entropy coding unit 63 dissolves an inputted quantization index into bit planes, and performs binary arithmetic coding by a unit of bit plane to output a bit plane code stream. Entropy coding processing executed in the entropy coding unit 63 is also capable of dividing a factor in a sub-band into several blocks and executing the entropy coding processing for each divided block independently. This block is referred to as a code block. FIG. 12 shows an example of division of the code block. In FIG. 12, reference numeral 111 denotes a sub-band, and 112 denotes a code block.

In the normalization method used in the normalization processing unit 12, a size of the code block in the entropy coding unit 63 may be designated.

FIGS. 9A and 9B are diagrams for explaining operations of the entropy coding unit 63. In this example, three non-zero quantization indexes exist in an area in a code block having a size of 4×4, and the quantization index have values of +13, −6, and +3, respectively. The entropy coding unit 63 scans this area to find a maximum value M and calculates the number of bits S necessary for representing a maximum quantization index according to the following expression:

$$S = \text{ceil}(\log 2 \ (abs(M))) \quad \text{(Expression 6)}$$

Here, ceil (x) represents a minimum integer value among integers of x or more. In FIG. 9A, S is four because the maximum factor value is 13, and sixteen quantization indexes in a sequence are processed with four bit planes as a unit as shown in FIG. 9B. First, the entropy coding unit 63 subjects respective bits of a most significant bit (represented by MSB in the figure) to the entropy coding (in this embodiment, binary arithmetic coding) and outputs the bits as a bit stream. Next, the entropy coding unit 63 lowers a bit plane by one level and subjects respective bits in the bit plane to coding and outputs bit streams to a code output unit 5, and repeats this processing in the same manner until an object bit plane reaches a least significant bit plane (represented by LSB in the figure).

Note that, at the time of the entropy coding, concerning a sign of each quantization index, it is assumed that, immediately after a non-zero bit which should be coded first (most significantly) is detected in bit plane scanning from an upper bit to a lower bit, one bit indicating a plus or minus sign of this quantization index is subjected to binary arithmetic coding. Consequently, plus and minus signs of quantization indexes other than zero are coded efficiently.

As described above, although the entropy coding is performed for each bit plane in this embodiment, it is also possible not to perform the entropy coding for a lower bit plane. In general, an upper bit plane has a relatively high redundancy, whereas a lower bit plane has a relatively low redundancy. Since the entropy coding processing in this embodiment is executed based upon a redundancy of a bit plane to be an object of coding, even if a lower bit plane is subjected to the entropy coding, a large compression effect may not be expected. Moreover, since the entropy coding processing is processing requiring a relatively long processing time, it is possible to obtain a compression effect of a relative same degree and, at the same time, reduce the processing time by not executing the entropy coding of the lower bit plane.

In the normalization method used in the normalization processing unit 12, presence or absence of the entropy coding of a lower bit plane in the entropy coding unit 63 may be designated.

FIGS. 10A, 10B, 10C, and 10D are diagrams showing schematic structures of code strings generated in the code output unit 64. FIG. 10A shows an overall structure of a code string. In the figure, reference symbol MH denotes a main header, TH denotes a tile header, and BS denotes a bit stream. As shown in FIG. 10B, the main header MH includes a size of an image to be an object of coding (the number of pixels in horizontal and vertical directions), a size of a tile when the image is divided into a plurality of tiles which are rectangular areas, the number of components representing the number of each color component, a size of each component, and component information representing bit accuracy. Note that, in this embodiment, since an image is not divided into tiles, a tile size and an image size take the same value and, in the case in which an object image is a monochrome multilevel image, the number of components is one.

Next, FIG. 10C shows a structure of the tile header TH. The tile header TH includes a tile length including a bit stream length and a header length of the tile and coding parameter for the tile. A level of discrete wavelet conversion, a type of a filter, and the like are included in the coding parameters. FIG. 10D shows a structure of a bit stream in this embodiment. In the figure, bit streams are collected for each sub-band and arranged in an order of increasing resolutions with a sub-band of a smallest resolution at the front. Moreover, in each sub-band, bit planes are arranged from an upper one to a lower one, and codes are arranged with a bit plane as a unit.

In this embodiment, an example of a hierarchical code string according to a resolution is shown. However, in addition to this, it is also possible to form a code string so as to be a hierarchical code string according to an image quality, a hierarchical code string according to a position, or a hierarchical code string according to a component (luminance component or color component). Such a hierarchical order is referred to as a progressive order. In the normalization method used in the normalization processing unit 12, a type of the progressive order in the code output unit 64 may be designated.

<Image Decoding Processing>

Figure 19:
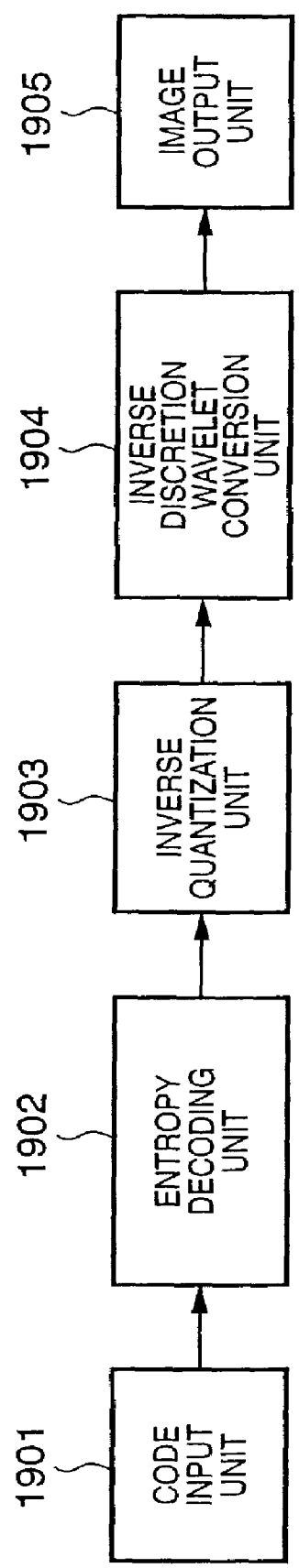
FIG. 19 is a block diagram showing a functional structure of a decoding unit 32 of the normalization processing unit 21.

Next, processing for decoding a bit stream with the image coding apparatus described above will be described. FIG. 19 shows a functional structure of the decoding unit 32 of the normalization processing unit 21.

The decoding unit 32 includes a code input unit 1901, an entropy decoding unit 1902, an inverse quantization unit 1903, an inverse discrete wavelet conversion unit 1904, and an image output unit 1905.

The code input unit 1901 is a unit for inputting the code string, analyzing a header included in the code string to extract parameters necessary for the following processing, and controlling a flow of processing if necessary or sending pertinent parameters to the processing unit following it. In addition, a bit stream included in the code string is outputted to the entropy decoding unit 1902.

The entropy decoding unit 102 decodes and outputs the bit stream by a unit of bit plane. FIGS. 11A and 11B show decode procedures at this point. FIGS. 11A and 11B are diagrams showing a flow of processing for sequentially decoding areas of sub-bands to be an object of decoding by a unit of bit plane and finally restoring a quantization index. Bit planes are decoded in an order indicated by arrow in the figure. The restored quantization index is outputted to the inverse quantization unit 1903.

The inverse quantization unit 1903 restores a discrete wavelet conversion factor from the inputted quantization index based upon the following expressions:

$$c' = \Delta \times q; \ q \neq 0 \quad \text{(Expression 7)}$$

$$c' = 0; \ q = 0 \quad \text{(Expression 8)}$$

Here, q is a quantization index and $\Delta$ is a quantization step. $\Delta$ is the same value as used at the time of coding. c' is a restored conversion factor, which is obtained by restoring the factor represented by s or d at the time of coding. The conversion factor c' is outputted to the inverse discrete wavelet conversion unit 1904 following the inverse quantization unit 1903.

Figure 20A:
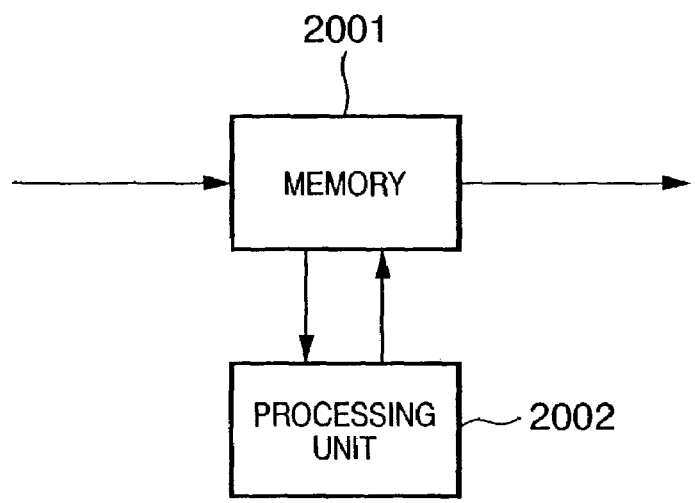
FIG. 20A is a block diagram showing a structure and processing of an inverse discrete wavelet conversion unit 1904.
Figure 20B:
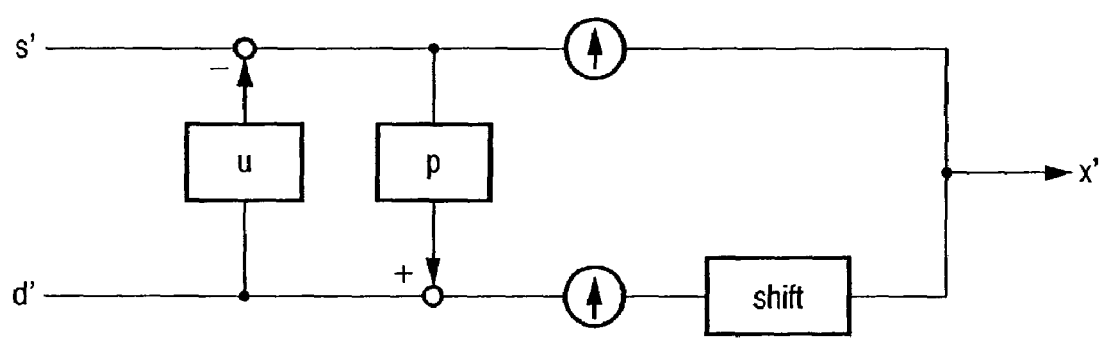
FIG. 20B is a block diagram showing a structure and processing of the inverse discrete wavelet conversion unit 1904.

FIGS. 20A and 20B are block diagrams showing a structure and processing for the inverse discrete wavelet conversion unit 1904. In FIG. 20A, an inputted conversion factor is stored in a memory 2001. A processing unit 2002 performs one-dimensional inverse discrete wavelet conversion and reads out conversion factors sequentially from the memory 2001 to process the conversion factors, thereby executing two-dimensional inverse discrete wavelet conversion. The two-dimensional inverse discrete wavelet conversion is executed by procedures opposite to forward conversion. Since details of the two-dimensional inverse discrete wavelet conversion is publicly known, a description thereof will be omitted. In addition, FIG. 20B shows a processing block of the processing unit 2002. In the processing block, the inputted conversion factors are subjected to two filter processing of u and p and superimposed after being subjected to up-sampling, whereby an image signal x' is outputted. The processing is performed according to the following expressions:

$$x'(2n)=s'(n)-\text{floor}((d'(n-1)+d'(n))/4) \quad \text{(Expression 9)}$$

$$x'(2n+1)=d'(n)+\text{floor}((x'(2n)+x'(2n+2))/2) \quad \text{(Expression 10)}$$

Here, since the discrete wavelet conversions in the forward direction and the inverse direction according to (Expression 1) and (Expression 2) as well as (Expression 9) and (Expression 10) satisfy complete reconstruction conditions, in this embodiment, if the quantization step $\Delta$ is one and all bit planes are decoded in the bit plane decoding, the restored image signal x' coincides with a signal x of an original image.

An image is restored by the above processing and outputted to the image output unit 1905. The image output unit 1905 may be an image display apparatus such as a monitor or may be a storage device such as a magnetic disk.

[Second Embodiment]

In the first embodiment, data to be an object of signature is image data. However, the present invention is not limited to this, and the data to be an object of signature may be any data, for example, a compression-coded code stream. In this embodiment, the case in which signature object data is a compression-coded code stream will be described.

Figure 4:
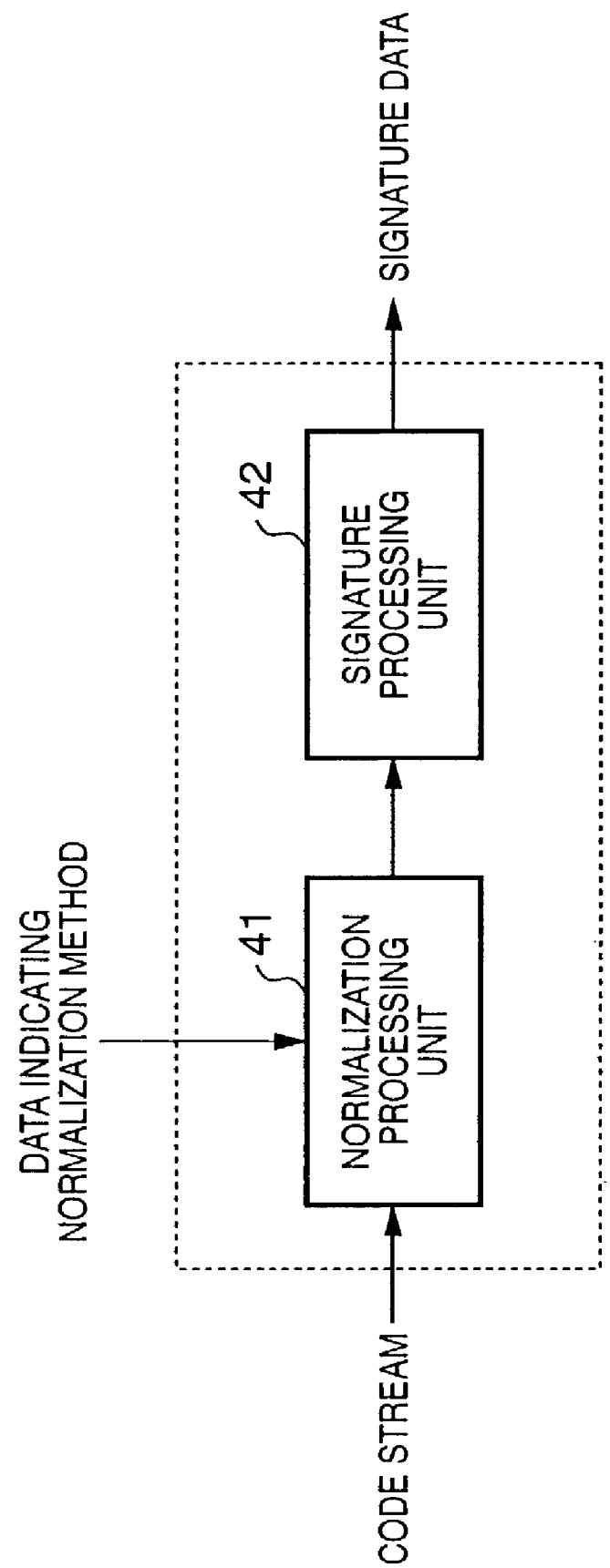
FIG. 4 is a block diagram showing a functional structure of a signature device in accordance with a second embodiment of the present invention.

FIG. 4 shows a functional structure of a signature device in accordance with this embodiment. As shown in the figure, the signature device in this embodiment includes a normalization processing unit 41 and a signature processing unit 42.

A code stream to be an object of signature processing and data indicating a predetermined normalization method are inputted to the normalization processing unit 41. The inputted code stream is subjected to normalization processing in accordance with an inputted normalization method, and a normalized code stream is outputted. Since the normalization processing unit 41 in this embodiment executes the same processing as in the normalization processing unit in FIG. 3, a detailed description of the processing will be omitted.

By using this embodiment, it also becomes possible to execute the signature processing with respect to a code stream which has already been subjected to compression coding.

[Third Embodiment]

In the first and second embodiment, a normalization method is designated at the time of signature processing, and the signature processing is executed for a normalized code stream which is subjected to normalized processing in accordance with the designated normalization method.

Figure 13:
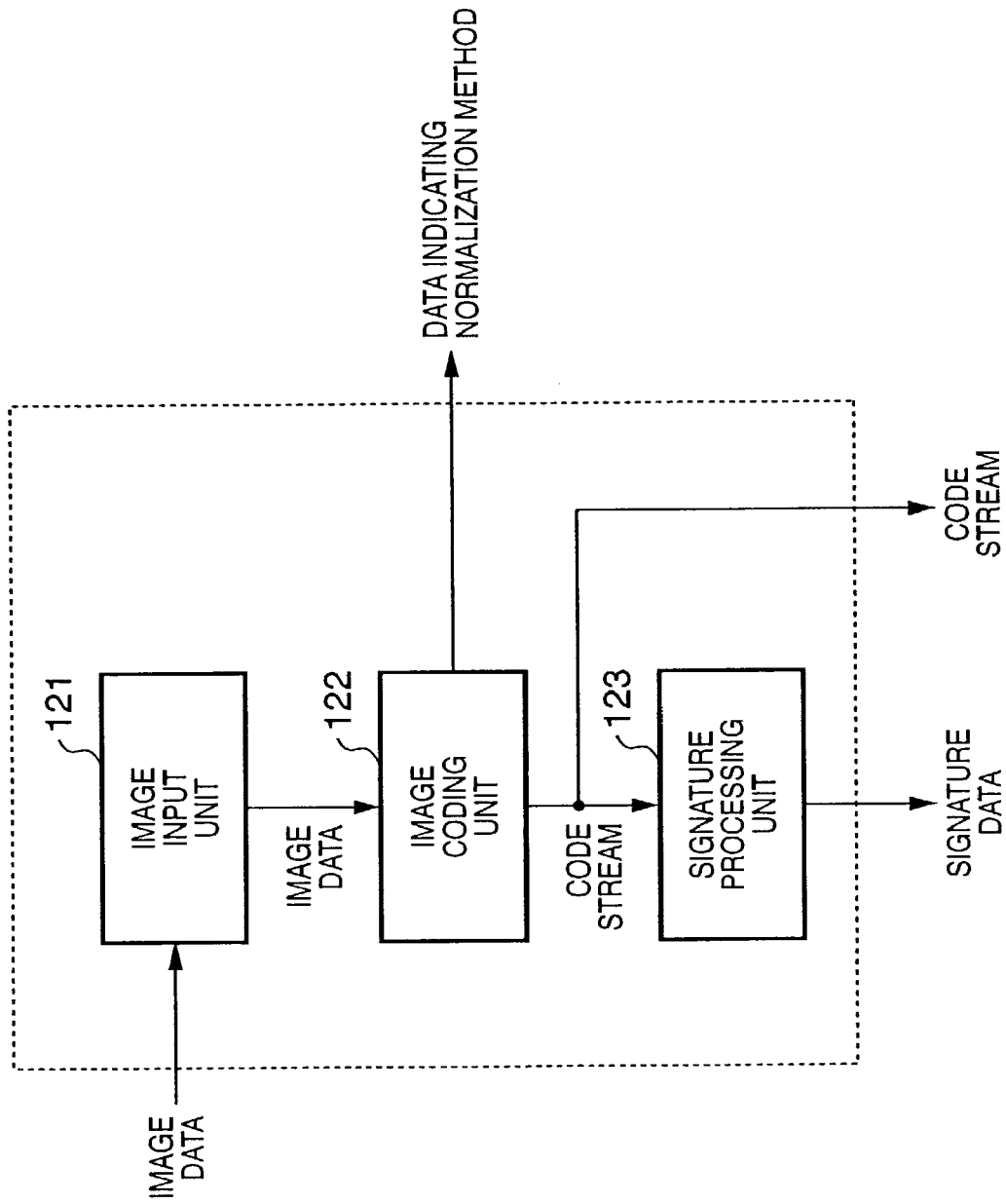
FIG. 13 is a block diagram showing a functional structure of a signature device in accordance with a third embodiment of the present invention.

However, it is also possible to output coding parameters used in the image coding unit 14 as data indicating a normalization method without designating a normalization method at the time of signature processing. FIG. 13 shows a functional structure of the signature device in this case. As shown in the figure, the signature device of this embodiment includes an image input unit 121, an image coding unit 122, and a signature processing unit 123.

An image signal to be an object of signature processing is inputted to the image input unit 121, and the signal is outputted to the image coding unit 122. Since processing in the image input unit 121 is the same as that in the image input unit 11, a detailed description of the processing will be omitted.

The image coding unit 122 applies compression coding processing to the inputted image data to generate a code stream, and outputs the generated code stream to the signature processing unit 123 and the verification device, respectively. Moreover, the image coding unit 122 outputs compression coding parameters used in this compression coding to the verification device as data indicating a normalization method. The code stream is inputted to the signature processing unit 123, and the signature processing unit 123 calculates signature data of the inputted code stream and outputs the calculated signature data to the verification device.

According to the above processing, the code stream, the data indicating a normalization method, and the signature data are outputted to the verification device. The verification device inputs these code stream and data and performs the verification processing in accordance with the processing described in the first embodiment.

By using the structure as described above, since it is unnecessary to execute the normalization processing in the signature device, the signature processing can be performed faster than the above-described embodiments.

[Fourth Embodiment]

In the first to third embodiment, the signature device and the verification device are described, respectively. In this embodiment, a system using these signature device and verification device will be described.

Figure 16:
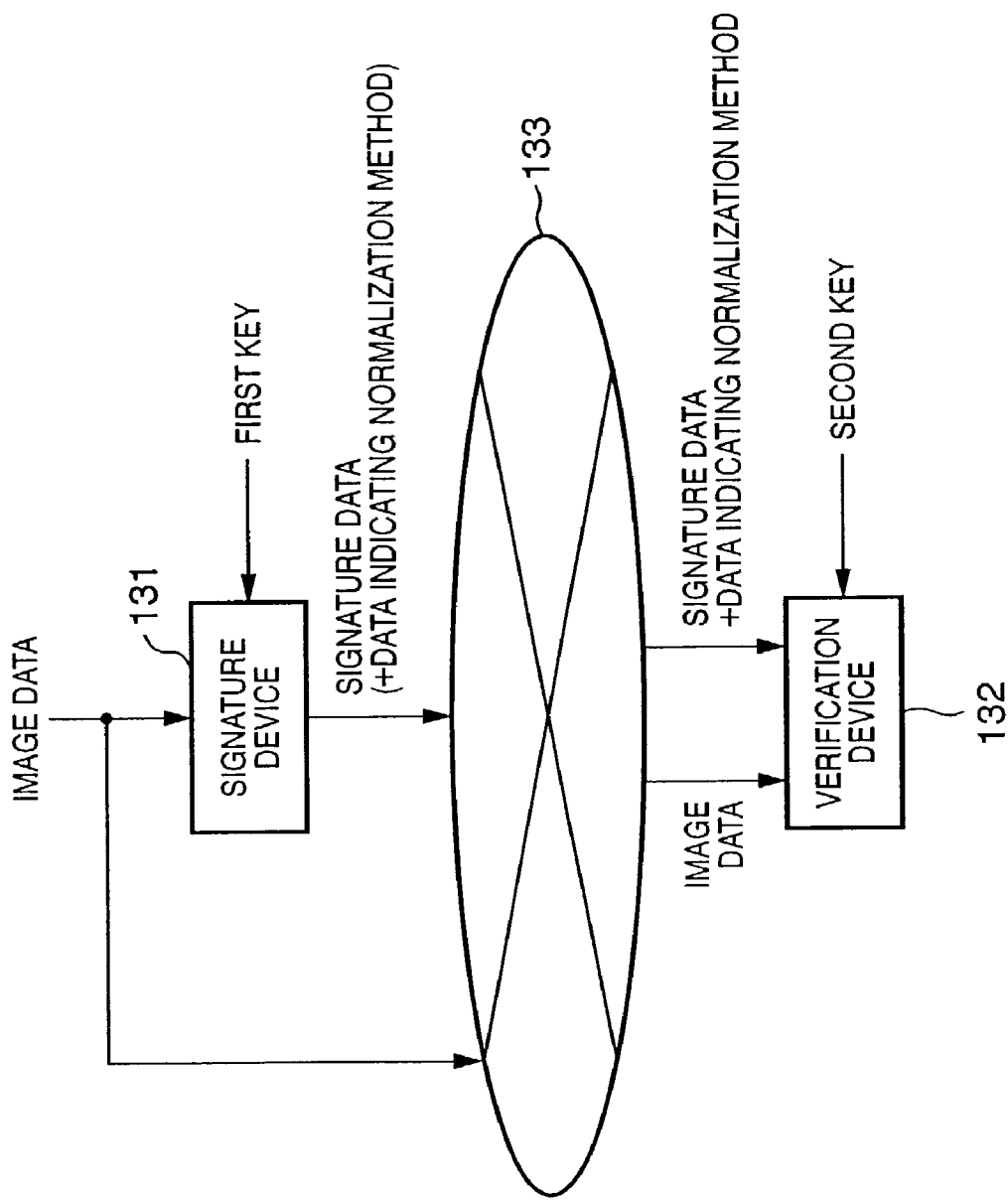
FIG. 16 is a block diagram showing a functional structure of a system in accordance with a fourth embodiment of the present invention.

FIG. 16 shows a functional structure of the system in this embodiment. As shown in the figure, the system of this embodiment includes a signature device 131 and a verification device 132. The signature device 131 and the verification device 132 are connected by a network 133 such as the Internet or a LAN, and data communication is possible between the devices.

Signature object image data is inputted to the signature device 131 and is subjected to signature processing using a first key, and signature data is outputted. Note that any signature device of the above-described embodiments may be used as the signature device in this embodiment. For example, in the case in which the signature device in accordance with the second embodiment is applied, data which should be inputted is a code stream. In addition, the normalization processing is also performed in the signature device in this embodiment as in the above-described embodiments. The normalization method may be designated from the outside as in the first and second embodiments, or the compression coding parameters used in the image coding unit 14 may be used as data indicating the normalization method as in the third embodiment. Further, it is assumed that a code stream is not outputted from the signature device of this embodiment.

Thus, in any case, the signature data, the data indicating a normalization method, and the image data of the signature object are sent to the verification device 132 from the signature device via a network 133.

The verification device 132 receives these data and performs verification processing for judging whether or not the received image data is falsified using a second key. Here, The second key is the same as the first key or is a key corresponding to the first key. In addition, contents of the verification processing are the same as those of the processing method described in the first embodiment. In addition, in this embodiment, since image data is inputted to the verification device, the verification device subjects the image data to compression coding with predetermined compression coding parameters, and performs normalization processing based upon received data indicating a normalization method or performs normalization processing using data indicating a normalization method and, at the same time, performs compression coding processing, and applies verification processing to a code stream obtained as a result of the compression coding processing.

In addition, in the case in which a code stream is sent from the signature device instead of image data, the verification device 132 performs the same verification processing as in the above-described embodiments.

Since an unspecified large number of users is accessible to the network 133, the image data inputted to the signature device 131 is likely to be falsified until the image data is inputted to the verification device 132. Whether or not the image data is falsified can be verified by inputting signature data, which was outputted when the image data was signed, and data indicating a normalization method corresponding to the signature data to the verification device 132. That is, in order to perform the verification correctly, a normalization method used at the time of signature is necessary, and the normalization method can also be used as a third key for performing the verification processing.

[Other Embodiments]

It is needless to mention that the objects of the present invention can also be attained by supplying a recording medium (or storage medium), which has recorded therein a program code of software for realizing the functions of the above-described embodiments, to a system or an apparatus, and a computer (or CPU or MPU) of the system or the apparatus reading out to execute the program code recorded in the recording medium. In this case, the program code itself read out from the recording medium realizes the functions of the embodiments, and the recording medium having the program code recorded therein constitutes the present invention.

In addition, it is needless to mention that the present invention includes the case in which the functions of the embodiments are realized by the computer executing the read out program code but also the case in which an operating system (OS) or the like running on the computer performs a part or all of actual processing based upon instructions of the program code and the functions of the embodiments are realized by the processing.

Moreover, it is needless to mention that the present invention includes the case in which, after the program code read out from the storage medium is written in a function extended card inserted in the computer or a memory provided in a function extended unit connected to the computer, a CPU or the like provided in the function extended card or the function extended unit performs a part or all of actual processing based upon instructions of the program code and the above-described embodiments are realized by the processing.

In the case in which the present invention is applied to the recording medium, a program code corresponding to the above-described flowchart is stored in the recording medium.

As described above, according to the present invention, presence or absence of falsification with respect to compression-coded data, which is subjected to lossless compression coding using compression coding parameters different from each other, can be verified.

As many apparently widely different embodiments of the present invention can be made without departing from the spirit and scope thereof, it is to be understood that the invention is not limited to the specific embodiments thereof except as defined in the appended claims.

What is claimed is:

1. An information processing method performed by a verification device which verifies whether or not falsification has been applied to compression-coded data to be outputted from a coding device, comprising:
   a holding step of holding verification data which is obtained based upon compression-coded data in a normalized state generated in said coding device;
   an input step of inputting compression-coded data, which is obtained by coding object data in said coding device, and normalization information, which indicates a reference for converting the compression-coded data into the normalized state, from said coding device;
   a normalization step of normalizing the compression-coded data, which is inputted in said input step, using the normalization information;
   a second calculation step of calculating a second value based upon the compression-coded data normalized in said normalization step; and
   a determination step of determining whether or not falsification has been applied to the compression-coded data, which is inputted in said input step, according to a result of comparison of the first value and the second value.

2. The information processing method according to claim 1,
   wherein coding performed by said coding device is lossless compression coding.

3. The information processing method according to claim 1,
   wherein the verification data held in said holding step is data generated based upon compression-coded data, which is obtained by normalizing and compressing coding object data in said coding device, and the data is received from said coding device by said verification device.

4. The information processing method according to claim 1,
   wherein the verification data held in said holding step is data generated by converting compression-coded data, which is obtained by normalizing and compressing coding object data in said coding device, into another value and encrypting te value with an encryption key, and the data is received from said coding device by said verification device.

5. The information processing method according to claim 4,
   wherein said encryption key is a secret key.

6. The information processing method according to claim 4,
   wherein, in said first calculation step, the first value is calculated by decrypting the verification data using a predetermined decryption key.

7. The information processing method according to claim 6,
   wherein said decryption key is a secret key.

8. The information processing method according to claim 6,
   wherein said decryption key is a public key.

9. The information processing method according to claim 1,
wherein the verification data held in said holding step is data generated by converting compression-coded data, which is obtained by normalizing and compressing coding object data in said coding device, into a Hash value and encrypting the Hash value with an encryption key, and the data is received from said coding device by said verification device.

10. The information processing method according to claim 9,
wherein, in said first calculation step, the firs value equivalent to the Hash value is calculated by decrypting the verification data using a predetermined decryption key.

11. The information processing method according to claim 1,
wherein, in said determination step, in the case in which the first value and the second value are not equal, it is determined that falsification has been applied to the compression-coded data inputted in said input step.

12. An information processing apparatus for verifying whether or not falsification has been applied to compression-coded data to be outputted from a coding device, comprising:
holding means for holding verification data which is obtained based upon compression-coded data in a normalized state generated in said coding device;
input means for inputting compression-coded data, which is obtained by coding object data in said coding device, and normalization information, which indicates a reference for converting the compression-coded data into the normalized state, from said coding device;
normalization means for normalizing the compression-coded data, which is inputted by said input means, using the normalization information;
first calculation means for calculating a first value based upon the verification data;
second calculation means for calculating a second value based upon the compression-coded data normalized by said normalization means; and
determination means for determining whether or not falsification has been applied to the compression-coded data, which is inputted by said input means, according to a result of comparison of the first value and the second value.

13. A program embodied in a computer-readable storage medium for causing a computer to execute an information processing method comprising the steps of:
a holding step of holding verification data which is obtained based upon compression-coded data in a normalized state generated in said coding device;
an input step of inputting compression-coded data, which is obtained by coding object data in said coding device, and normalization information, which indicates a reference for converting the compression-coded data into the normalized state, from said coding device;
a normalization step of normalizing the compression-coded data, which is inputted in said input step, using the normalization information;
a second calculation step of calculating a second value based upon the compression-coded data normalized in said normalization step; and
a determination step of determining whether or not falsification has been applied to the compression-coded data, which is inputted in said input step, according to a result of comparison of the first value and the second value.

14. A computer-readable storage medium for storing a program for causing a computer to execute the steps of:
a holding step of holding verification data which is obtained based upon compression-coded data in a normalized state generated in said coding device;
an input step of inputting compression-coded data, which is obtained by coding object data in said coding device, and normalization information, which indicates a reference for converting the compression-coded data into the normalized state, from said coding device;
a normalization step of normalizing the compression-coded data, which is inputted in said input step, using the normalization information;
a second calculation step of calculating a second value based upon the compression-coded data normalized in said normalization step; and
a determination step of determining whether or not falsification has been applied to the compression-coded data, which is inputted in said input step, according to a result of comparison of the first value and the second value.

* * * * *

UNITED STATES PATENT AND TRADEMARK OFFICE
CERTIFICATE OF CORRECTION

| | | |
|---|---|---|
| PATENT NO. | : 7,167,988 B2 | Page 1 of 2 |
| APPLICATION NO. | : 10/465615 | |
| DATED | : January 23, 2007 | |
| INVENTOR(S) | : Junichi Hayashi | |

It is certified that error appears in the above-identified patent and that said Letters Patent is hereby corrected as shown below:

Sheet 18, Fig. 18, "STEAM/DATA" should read --STREAM/DATA--.

Col. 1, line 18, "is" should read --are--.

Col. 1, line 62, "andarithmetic" should read --and arithmetic--.

Col. 2, line 25, "characteristics that" should be deleted.

Col. 2, line 26, "are required" should be deleted.

Col. 4, line 41, "coding" (second occurrence) should be deleted.

Col. 5, line 2, "coding" (second occurrence) should be deleted.

Col. 7, line 36, "method" should read --methods--.

Col. 7, line 46, "is" should read --are--.

Col. 9, line 52, "is" should read --are--.

Col. 12, line 40, "sign (c) 1; $c \geq 0$" should read --sign (c) = 1; $c \geq 0$--.

Col. 12, line 41, "sign (c)=-1; $c \leq 0$" should read --sign (c)=-1; $c<0$--.

Col. 12, line 66, "index" should read --indexes--.

Col. 14, line 38, "decode" should read --decoding--.

Col. 16, line 28, "than" should read --than in--.

Col. 16, line 30, "embodiment," should read --embodiments--.

Col. 17, line 37, "out" should read --out the program code--.

Col. 17, line 44, "includes" should read --includes not only--.

Col. 18, line 51, "te" should read --the--.

UNITED STATES PATENT AND TRADEMARK OFFICE
CERTIFICATE OF CORRECTION

PATENT NO. : 7,167,988 B2
APPLICATION NO. : 10/465615
DATED : January 23, 2007
INVENTOR(S) : Junichi Hayashi It is certified that error appears in the above-identified patent and that said Letters Patent is hereby corrected as shown below:

Col. 19, line 12, "firs" should read --first--.

Signed and Sealed this

Twenty-fourth Day of July, 2007

JON W. DUDAS
*Director of the United States Patent and Trademark Office*